US007305297B2

(12) United States Patent
Yasui et al.

(10) Patent No.: US 7,305,297 B2
(45) Date of Patent: Dec. 4, 2007

(54) CONTROLLER FOR CONTROLLING A PLANT

(75) Inventors: Yuji Yasui, Wako (JP); Kanako Shimojo, Wako (JP); Eiji Hashimoto, Wako (JP); Yshihisa Iwaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/642,550

(22) Filed: Dec. 21, 2006

(65) Prior Publication Data

US 2007/0100535 A1 May 3, 2007

Related U.S. Application Data

(62) Division of application No. 10/794,045, filed on Mar. 8, 2004, now Pat. No. 7,200,484.

(30) Foreign Application Priority Data

Mar. 12, 2003 (JP) .............................. 2003-66334

(51) Int. Cl.
*G06F 17/00* (2006.01)
*G06F 19/00* (2006.01)
*F02D 11/10* (2006.01)

(52) U.S. Cl. ....................... 701/103; 701/115; 123/399

(58) Field of Classification Search ................ 701/103, 701/104, 110; 60/276, 277, 284, 285, 289; 70/29-31, 37; 123/399, 677, 673, 680, 681; 73/116, 117.1, 118.2
See application file for complete search history.

(56) References Cited

U.S. PATENT DOCUMENTS 4,698,745 A 10/1987 Hiroi et al. ................... 700/45
4,907,154 A 3/1990 Yasuda et al. ................ 701/37
4,916,632 A 4/1990 Doi et al. ................... 700/280
5,135,186 A 8/1992 Ako .......................... 244/78.1
5,563,794 A 10/1996 Cosner et al. ................ 701/13
5,710,500 A 1/1998 Matsuo et al. .............. 318/799
5,994,868 A 11/1999 Takeuchi et al. ............ 318/616

FOREIGN PATENT DOCUMENTS

JP 05-263904 10/1993

*Primary Examiner*—Stephen K. Cronin
*Assistant Examiner*—Johnny H. Hoang
(74) *Attorney, Agent, or Firm*—Squire Sanders & Dempsey L.L.P.

(57) ABSTRACT

The present invention provides a controller for controlling a modeled plant robustly against disturbance. The controller comprises an estimator and a control unit. The estimator estimates disturbance applied to the plant. The control unit determines an input to the plant so that an output of the plant converges to a desired value. The input to the plant is determined to include a value obtained by multiplying the estimated disturbance by a predetermined gain. Since estimated disturbance is reflected in the input to the plant, control having robustness against disturbance is implemented. The controller may comprise a state predictor. The state predictor predicts the output of the plant based on the estimated disturbance and dead time included in the plant. The control unit determined the input to the plant so that the predicted output converges to a desired value. Since the state predictor allows for the dead time, the accuracy of the control is improved. The estimated disturbance is reflected in the predicted output, an error between the predicted output and an actual output of the plant is removed.

26 Claims, 25 Drawing Sheets

<Case G-1>

<Case G-2>

<Case G-3>

<Case G-4>

<Case G-5>

<Case G-6>

<Case G-7>

<Case N-1>

<Case N-2>

<Case N-3>

<Case N-4>

<Case N-5>

<Case N-6>

<Case N-7>

<Case N-8>

<Case N-9>

CONTROLLER FOR CONTROLLING A PLANT

BACKGROUND OF THE INVENTION

The present invention relates to an apparatus for robustly controlling a plant against disturbance.

The amount of air introduced into an engine is typically controlled so as to achieve a desired engine torque. According to a conventional method, a desired amount of air introduced into the engine is determined referring to a map based on an opening angle of an accelerator pedal, a vehicle speed and a selected transmission gear ratio. An opening angle of a throttle valve is controlled in accordance with the desired amount of air to be introduced into the engine.

According to another method disclosed in Japanese Patent No. 2780345, a desired torque of an engine output shaft is determined in accordance with an opening angle of an accelerator pedal and a rotational speed of the output shaft of a torque converter. A desired opening angle of a throttle valve is determined referring to a predetermined table based on an actual rotational speed and the desired torque of the engine output shaft. Air is introduced into the engine in accordance with the desired throttle opening angle.

Such conventional control does not take into account disturbance applied into the intake manifold and dead time from the throttle valve to the engine. Such factors reduce the accuracy of controlling air to be introduced into the engine, causing vibration in the engine torque.

Such a problem regarding robustness against disturbance exists in rotational speed control for the engine.

Conventionally, when an engine is idling, a conventional PID control is performed for controlling an engine rotational speed. According to such conventional rotational speed control, when a sudden change in the engine load occurs during idling operation, the engine tends to stop because the engine rotational speed cannot be stable. For example, when a vehicle with a manual transmission mechanism starts and a clutch is forced to engage suddenly, the engine of the vehicle tends to stop.

Japanese Patent No. 3203602 discloses a scheme for reducing shock that may make passengers of the vehicle uncomfortable when gear change occurs in an automatic transmission mechanism. According to the scheme, a desired torque of a driving shaft is determined based on a vehicle speed and an opening angle of the accelerator pedal. A desired engine torque and a desired engine rotational speed that provide the desired driving shaft torque are determined. An opening angle of the throttle valve is determined based on the desired engine torque and the desired engine rotational speed. The throttle valve is controlled in accordance with the determined opening angle.

Conventionally, in a vehicle that comprises an automatic manual transmission (automatic MT) or an automatic transmission (AT), when gear change occurs, a rotational speed synchronization control capable of achieving a quick response is not performed. Thus, a rotational speed cannot be adapted to a selected transmission gear ratio quickly.

Thus, there is a need for control that has high robustness against disturbance.

SUMMARY OF THE INVENTION

According to one aspect of the present invention, a controller for controlling a modeled plant is provided. The controller comprises an estimator for estimating disturbance applied to the plant and a control unit for determining an input to the plant so that an output from the plant converges to a desired value. The input to the plant is determined to include a value obtained by multiplying the estimated disturbance by a predetermined gain.

An error between the output of the plant and a desired value for the output of the plant may be caused by disturbance applied to the plant. According to the invention, the controller can quickly cause such an error to converge to zero since the input to the plant includes the estimated disturbance.

According to one embodiment of the present invention, the control unit uses a preview control to determine the input to the plant. The preview control can implement a feasible control for the plant when dead time is included in the plant.

According to one embodiment of the present invention, the input to the plant is determined to include a value obtained by multiplying a desired value for the output of the plant by a predetermined gain. Thus, the capability that the output of the plant follows the desired value is improved.

According to another embodiment of the present invention, the control unit uses a response assignment control to determine the input to the plant. The response assignment control enables an error between the output of the plant and a desired value for the output of the plant to converge to zero without generating overshooting.

According to one embodiment of the present invention, the estimator is an adaptive disturbance observer that identifies the disturbance using a recursive identification algorithm. Such a recursive identification algorithm can quickly and stably identify the estimated disturbance. When noise is included in the output of the plant, variation may occur in the estimated disturbance due to such noise. The effect of a statistical process of the recursive identification algorithm can remove such variation in the estimated disturbance.

According to another aspect of the present invention, the controller further comprises a state predictor for predicting the output of the plant based on the estimated disturbance and dead time included in the plant. The control unit determines the input to the plant so that the predicted output converges to a desired value for the output of the plant. Since the dead time is compensated for by the state predictor, a response of the control is improved. Since the predicted output is determined taking into account the estimated disturbance, an error between the predicted output and the actual output of the plant is removed.

Conventional generalized predictive control requires decreasing a gain when a dead time of the plant is taken into account. The state predictor removes such decrease of the gain since the dead time is compensated for by the state predictor.

According to one embodiment of the present invention, the plant is an intake manifold connected to an engine. The intake manifold is modeled so that its input is a desired value for an opening angle of a valve that controls an amount of air introduced into the intake manifold and its output is an amount of air introduced into the engine. Thus, an amount of air introduced into the engine converges to a desired value with high accuracy, thereby accurately controlling an engine torque. The input into the plant may be a desired value for an opening angle of a throttle valve provided in the intake manifold.

According to one embodiment of the present invention, a model parameter for the modeled plant is determined based on an actual engine rotational speed and an actual opening angle of the throttle valve. The model parameter thus determined achieves an accurate control for the engine torque under various engine operating conditions.

According to one embodiment of the present invention, the plant is an engine. The engine is modeled so that its input is a desired value for an amount of air introduced into the engine and its output is a rotational speed of the engine. Thus, engine stall that may occur when the engine starts is suppressed. A response of the engine rotational speed control when a transmission gear change occurs is improved.

According to another embodiment of the present invention, the controller determines a model parameter for the modeled plant based on a detected rotational speed. The input to the plant is determined using the model parameter. The model parameter thus determined achieves an accurate control for the rotational speed under various engine operating conditions.

According to another embodiment of the present invention, the input to the plant includes a value obtained by multiplying by a predetermined gain an estimated value for a torque required for driving the vehicle. According to another embodiment of the present invention, the input to the plant includes a value obtained by multiplying by a predetermined gain an estimated value for a torque required for driving equipments mounted on the vehicle. Thus, an error between the output of the plant and its desired value that may be caused by the vehicle-driving torque and the equipment-driving torque can converge.

According to one embodiment of the present invention, the state predictor further determines the predicted output based on the estimated value for the vehicle-driving torque. According to another embodiment of the present invention, the state predictor determines the predicted output based on the estimated value for the equipment-driving torque. Thus, an error between the predicted output and a desired value for the output of the plant that may be caused by the vehicle-driving torque and the equipment-driving torque can converge.

DESCRIPTION OF THE PREFERRED EMBODIMENTS

Structure of Internal Combustion Engine and Control Unit

Figure 1:
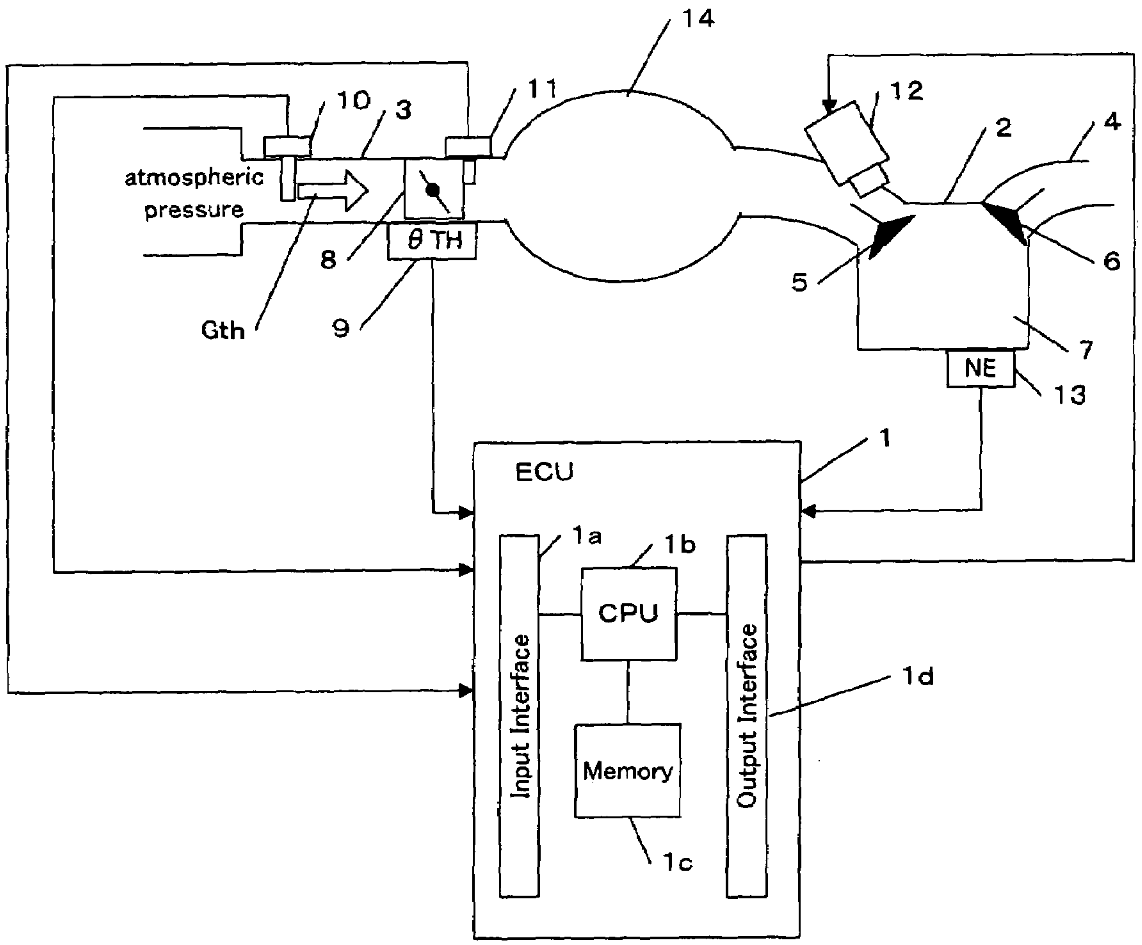
FIG. 1 is a block diagram of an internal combustion engine and its control unit in accordance with one embodiment of the present invention.

Referring to the drawings, specific embodiments of the invention will be described. FIG. 1 is a block diagram showing an internal combustion engine (hereinafter referred to as an engine) and its control unit in accordance with one embodiment of the invention.

An electronic control unit (hereinafter referred to as an ECU) 1 comprises an input interface 1_a_ for receiving data sent from each part of the vehicle, a CPU 1_b_ for carrying out operations for controlling each part of the vehicle, a memory 1*c* including a read only memory (ROM) and a random access memory (RAM), and an output interface 1*d* for sending control signals to each part of the vehicle. Programs and various data for controlling each part of the vehicle are stored in the ROM. The ROM may be a rewritable ROM such as an EEPROM. The RAM provides work areas for operations by the CPU 1*b*, in which data sent from each part of the vehicle as well as control signals to be sent out to each part of the vehicle are temporarily stored.

The engine 2 is, for example, an engine equipped with four cylinders. Each cylinder comprises an intake valve 5 for connecting a combustion chamber 7 to an intake manifold 3 and an exhaust valve 6 for connecting the combustion chamber 7 to an exhaust manifold 4.

A throttle valve 8 is disposed upstream of the intake manifold 3. The throttle valve 8 is an electronic control valve. An opening angle of the throttle valve 8 is controlled by a control signal from the ECU 1. A throttle valve opening (θTH) sensor 9, which is connected to the throttle valve 8, outputs an electric signal corresponding to an opening angle of the throttle valve 8 and sends the electric signal to the ECU 1.

An airflow meter (AFM) 10 is provided upstream of the throttle valve 8. The airflow meter 10 detects the amount Gth of air passing through the throttle valve 8, and sends it to the ECU 1. The airflow meter 10 may be a vane-type airflow meter, a Karman-vortex type airflow meter, a hot-wire type airflow meter or the like.

An intake manifold pressure (Pb) sensor 11 is provided in the intake manifold 3 downstream of the throttle valve 8. A pressure Pb of the intake manifold detected by the Pb sensor 11 is sent to the ECU 1.

A fuel injection valve 12 is installed for each cylinder in the intake manifold 3 upstream of the intake valve 5. The fuel injection valve 12 is supplied with fuel from a fuel tank (not shown) and driven in accordance with a control signal from the ECU 1.

A rotational speed (Ne) sensor 13 is attached to the periphery of the camshaft or the periphery of the crankshaft (not shown) of the engine 2, and outputs a CRK signal at a predetermined crank angle cycle (for example, a cycle of 30 degrees). The cycle length of the CRK signal is shorter than the cycle length of a TDC signal that is issued at a crank angle cycle associated with a TDC position of the piston. Pulses of the CRK signal are counted by the ECU 1 to determine the rotational speed Ne of the engine.

Signals sent to the ECU 1 are passed to the input interface 1*a*. The input interface 1*a* converts analog signal values into digital signal values. The CPU 1*b* processes the resulting digital signals, performs operations in accordance with the programs stored in the ROM 1*c*, and creates control signals. The output interface 1*d* sends these control signals to actuators for the fuel injection valve 12 and other actuators.

Air introduced into the intake manifold 3 through the throttle valve 8 is filled in the chamber 14. When the intake valve 5 is opened, the air in the chamber 14 is supplied to the combustion chamber 7 of the engine 2. Fuel is supplied from the fuel injection valve 12 to the combustion chamber 7. The air-fuel mixture is ignited by a spark plug (not shown) in the combustion chamber 7.

Block Diagram of Control Unit

Figure 2:
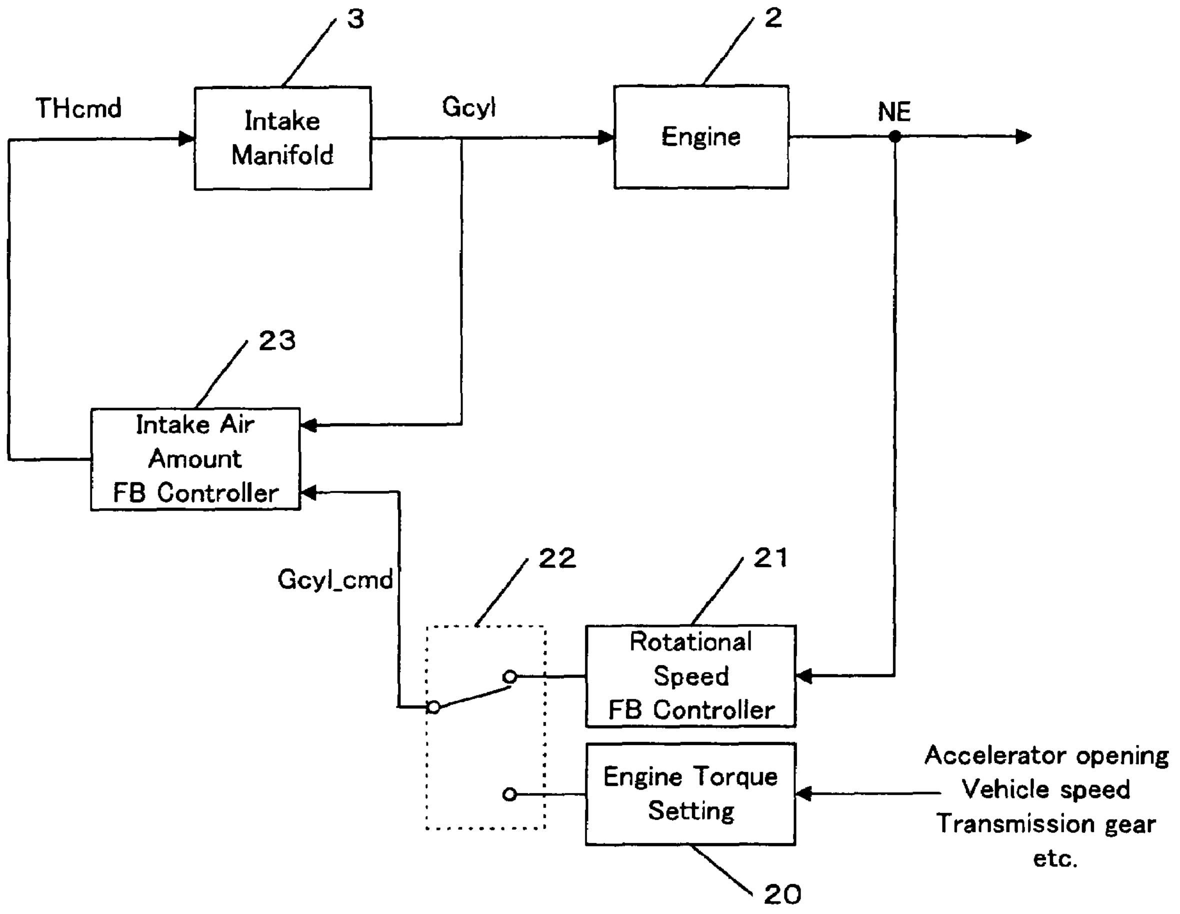
FIG. 2 is a block diagram of a control unit in accordance with one embodiment of the present invention.

FIG. 2 shows a block diagram of the control unit in accordance with one embodiment of the present invention. An engine torque setting unit 20, a rotational speed feedback (FB) controller 21, a switch 22 and an intake air amount feedback (FB) controller 23 are typically implemented by computer programs that are stored in the memory 1*c* (FIG. 1). Alternatively, functions of the blocks may be implemented by software, firmware, hardware or any combination thereof.

The torque setting unit 20 refers to a map pre-stored in the memory 1*c* based on an opening angle of the accelerator pedal, a vehicle speed, a transmission gear ratio or the like to determine a desired engine torque. The torque setting unit 20 determines the amount of intake air required for the desired engine torque as a desired intake air amount Gcyl_cmd.

The rotational speed FB controller 21 performs a feedback control for the engine rotational speed NE. The engine 2 is an object to be controlled (hereinafter referred to as a "plant") by the rotational speed feedback control. In the feedback control, a control input is a desired intake air amount Gcyl_cmd and a control output is the engine rotational speed NE. The rotational speed FB controller 21 determines the desired intake air amount Gcyl_cmd so that the engine rotational speed NE converges to a desired value.

When the vehicle is in a normal running condition, an intake air amount FB controller 23 is connected to the torque setting unit 20 through the switch 22. The intake air amount FB controller 23 uses the desired intake air amount Gcyl_cmd determined by the torque setting unit 20. When the engine is idling or when gear change is being carried out in the transmission, the intake air amount FB controller 23 is connected to the rotational speed FB controller 21. The intake air amount FB controller 23 uses the desired intake air amount Gcyl_cmd determined by the rotational speed FB controller 21.

The intake air amount FB controller 23 performs a feedback control for the amount of intake air Gcyl introduced into the cylinder of the engine. The plant of the feedback control is the intake manifold 3. In the feedback control, a control input is a desired value THcmd for the opening angle of the throttle valve and a control output is the intake air amount Gcyl introduced into the engine. The intake air amount FB controller 23 determines the desired value THcmd for the opening angle of the throttle valve so that the intake air amount Gcyle converges to the desired value Gcyl_cmd. The throttle valve 8 is controlled by the ECU 1 in accordance with the desired throttle opening angle THcmd.

Thus, when the engine is idling or when gear change occurs in the transmission, the intake air amount for causing the rotational speed NE to converge to a desired value is established as a desired intake air amount. Accordingly, engine stall when the engine is idling can be suppressed. The rotational speed when gear change occurs in the transmission can stably and quickly converge to a desired value.

In the present specification, the intake air amount FB control will be first described and then the rotational speed FB control will be described.

1. Intake Air Amount Feedback Control 1.1 Modeling of Dynamic behavior of Intake Air A method for modeling the dynamic behavior of intake air will be described. The intake manifold 3 is represented by a model in which its input is THcmd and its output is Gcyl.

The amount of intake air Gcyl' introduced into each cylinder in each cycle can be expressed by equation (1) based on the ideal gas equation of state that is known. In the equation (1), Kηc' denotes a charging efficiency (%) of the intake 0manifold, Pb denotes a pressure (Pa) of the intake manifold, Vcyl denotes a volume ($m^3$) of the cylinder, Tcyl denotes a temperature inside of the cylinder (K), R denotes the gas constant ($m^3 \cdot Pa/g \cdot K$), and "n" denotes an identifier for identifying each sampling cycle.

$$Gcyl'(n) = K\eta c \cdot Pb(n) \quad (1)$$
$$\text{where } K\eta c = K\eta' c \frac{Vcyl}{R \cdot Tcyl}$$

In case of an in-line 4-cylinder engine, the intake of air is performed twice for each rotation of the engine. The amount of air introduced into the cylinder per unit time Gcyl is shown in the equation (2). Here, NE denotes an engine rotational speed (rpm) and k denotes an identifier for identifying each sampling cycle. Fcyl is a function of the rotational speed NE.

$$\begin{aligned} Gcyl(k) &= \frac{Gcyl'(k) \cdot 2 \cdot NE}{60} \\ &= Fcyl \cdot Pb(k) \end{aligned} \quad (2)$$
$$\text{where } Fcyl = \frac{2 \cdot K\eta c \cdot NE}{60}$$

On the other hand, the amount of air ΔGb that is to be filled in the chamber 14 is shown by the equation (3).

$$\Delta Gb(k) = Gth(k) - Gcyl(k) \quad (3)$$

As to the chamber 14, the equation (5) is derived from the ideal gas equation of state (4). Pb, Vb and Tb denote a pressure (Pa), a volume ($m^3$) and a temperature (K) of the intake manifold, respectively. R indicates the gas constant as described above.

$$Pb(k) \cdot Vb = Gb(k) \cdot R \cdot Tb \quad (4)$$
$$\Downarrow$$
$$\Delta Pb(k) \cdot Vb = \Delta Gb(k) \cdot R \cdot Tb$$
$$\Downarrow$$
$$\Delta Gb(k) = \frac{\Delta Pb(k) \cdot Vb}{R \cdot Tb} \quad (5)$$

The equation (6) is obtained by substituting the equation (5) into the equation (3). The amount of intake air Gcyl is represented as a function of the pressure Pb of the intake manifold as shown by the equation (6). T denotes the length of the sampling cycle.

$$\frac{\Delta Pb(k) \cdot Vb}{R \cdot Tb} = Gth(k) - Gcyl(k) \quad (6)$$
$$\Downarrow$$
$$\frac{\frac{(Pb(k) - Pb(k-1))}{T} Vb}{R \cdot Tb} = Gth(k) - Gcyl(k)$$
$$\Downarrow$$
$$Gcyl(k) = \frac{-Vb}{R \cdot Tb \cdot T} Pb(k) + \frac{Vb}{R \cdot Tb \cdot T} Pb(k-1) + Gth(k)$$

In order to use Gcyl to express the Pb of the equation (6), the equation (7) is derived by substituting the equation (2) into the equation (6). The equation (7) represents a model of the dynamic behavior of intake air in which its input model is Gth.

$$Gcyl(k) = \frac{-Vb}{Fcyl \cdot R \cdot Tb \cdot T} Gcyl(k) + \frac{Vb}{Fcyl \cdot R \cdot Tb \cdot T} Gcyl(k-1) + Gth(k) \quad (7)$$
$$\Downarrow$$
$$Gcyl(k) = \frac{Vb}{Fcyl \cdot R \cdot Tb \cdot T + Vb} Gcyl(k-1) + \frac{Fcyl \cdot R \cdot Tb \cdot T}{Fcyl \cdot R \cdot Tb \cdot T + Vb} Gth(k)$$

On the other hand, a relationship between the amount of air Gth passing through the throttle valve and an opening angle TH of the throttle valve is expressed by the equation (8). Here, Pc represents a pressure upstream of the throttle valve. Fth denotes a flow rate per effective opening angle of the throttle valve (g/deg), which is determined in accordance with the pressure Pb downstream of the throttle valve (that is, the pressure of the intake manifold) and the pressure Pc upstream of the throttle valve. The equation (9) is obtained by substituting the equation (8) into the equation (7). The equation (9) represents a model of the dynamic behavior of intake air in which its input is the opening angle TH of the throttle valve.

$$Gth(k) = Fth \cdot TH(k) \quad (8)$$
$$Gcyl(k) = \frac{Vb}{Fcyl \cdot R \cdot Tb \cdot T + Vb} Gcyl(k-1) + \frac{Fth \cdot Fcyl \cdot R \cdot Tb \cdot T}{Fcyl \cdot R \cdot Tb \cdot T + Vb} TH(k) \quad (9)$$

A relationship between a desired throttle opening angle THcmd and the actual throttle opening angle TH of the electronic throttle valve is represented by the equation (10). The equation (10) is a first-order delay system having a dead time "dth." The dead time dth is mainly caused by electronic communication that is required for operating the throttle valve. The equation (11) is obtained by substituting the equation (10) into the equation (9).

$$TH(k) = Ath \cdot TH(k-1) + (1 - Ath) \cdot THemd(k - dth) \quad (10)$$
$$\begin{aligned} Gcyl(k) = &\frac{Vb}{Fcyl \cdot R \cdot Tb \cdot T + Vb} Gcyl(k-1) + \\ &\frac{Ath \cdot Fth \cdot Fcyl(NE) \cdot R \cdot Tb \cdot T}{Fcyl \cdot R \cdot Tb \cdot T + Vb} TH(k-1) + \\ &\frac{(1 - Ath) \cdot Fth \cdot Fcyl \cdot R \cdot Tb \cdot T}{Fcyl \cdot R \cdot Tb \cdot T + Vb} THcmd(k - dth) \end{aligned} \quad (11)$$

It is seen from the equation (9) that TH(k−1) can be expressed using Gcyl(k−1) and Gcyl(k−2). The equation (12) is obtained by substituting the TH(k−1) into the equation (11). The equation (12) is a model equation of the dynamic behavior of intake air in which its input is the desired throttle opening angle THcmd and its output is the amount of intake air Gcyl.

$$\begin{aligned} Gcyl(k) = &\frac{Vb}{Fcyl \cdot R \cdot Tb \cdot T + Vb} Gcyl(k-1) + Ath \cdot Gcyl(k-1) - \\ &\frac{Ath \cdot Vb}{Fcyl \cdot R \cdot Tb \cdot T + Vb} Gcyl(k-2) + \\ &\frac{(1 - Ath) \cdot Fth \cdot Fcyl \cdot F \cdot Tb \cdot T}{Fcyl \cdot R \cdot Tb \cdot T + Vb} THcmd(k - dth) \end{aligned} \quad (12)$$

-continued $$\Downarrow$$

$$Gcyl(k) = Aair1 \cdot Gcyl(k-1) + Aair2 \cdot Gcyl(k-2) + Bair1 \cdot THcmd(k-dth)$$

$$\text{where } Aair = \frac{Ath(Fcyl \cdot R \cdot Tb \cdot T + Vb) + Vb}{Fcyl \cdot R \cdot Tb \cdot T + Vb}$$

$$Aair2 = -\frac{Ath \cdot Vb}{Fcyl \cdot R \cdot Tb \cdot T + Vb}$$

$$Bair1 = \frac{(1-Ath) \cdot Fth \cdot Fcyl \cdot R \cdot Tb \cdot T}{Fcyl \cdot R \cdot Tb \cdot T + Vb}$$

Model parameters Aair1, Aair2 and Bair1 include Fcyl and Fth that vary in accordance with the rotational speed NE, the intake manifold pressure Pb and the pressure Pc upstream of the throttle valve. The model parameters corresponding to the rotational speed NE and the throttle opening angle TH may be pre-stored in the memory 1*c* as a map. Alternatively, the controller may comprise an identifier for identifying such model parameters.

1.2 Problem in Applying a Generalized Predictive Control (GPC)

According to the invention, feedback control for the amount of intake air is implemented by a preview control algorithm. As a scheme similar to the preview control, generalized predictive control (hereinafter referred to as GPC) is known (in some cases, the GPC is included in the category of preview control). However, it is impossible to construct a feasible intake air amount feedback controller 23 only by using such conventional GPC. The reason will be described.

The model for the dynamic behavior of intake air shown in the equation (12) can be expressed as shown by the equation (13). Here, it is assumed that a value of the dead time dth is "2".

$$Gcyl(k) = Aair1 \cdot Gcyl(k-1) + Aair2 \cdot Gcyl(k-2) + Bair1 \cdot THcmd(k-2) \tag{13}$$

$$\Downarrow$$

$$Gcyl(k+1) = Aair1 \cdot Gcyl(k) + Aair2 \cdot Gcyl(k-1) + Bair1 \cdot THcmd(k-1)$$

When the equation (13) is expressed by a state-space equation, the equation (14) is obtained.

$$\begin{bmatrix} Gcyl(k+1) \\ Gcyl(k) \\ THcmd(k) \end{bmatrix} = \begin{bmatrix} Aair1 & Aair2 & Bair1 \\ 1 & 0 & 0 \\ 0 & 0 & 0 \end{bmatrix} \begin{bmatrix} Gcyl(k) \\ Gcyl(k-1) \\ THcmd(k-1) \end{bmatrix} + \begin{bmatrix} 0 \\ 0 \\ 1 \end{bmatrix} THcmd(k) \tag{14}$$

$$Gcyl(k) = [1\ \ 0\ \ 0] \begin{bmatrix} Gcyl(k) \\ Gcyl(k-1) \\ THcmd(k-1) \end{bmatrix}$$

$$\Downarrow$$

$$X'(k+1) = \Phi' X'(k) + G' THcmd(k)$$

$$Gcyl(k) = C' X'(k)$$

-continued $$\text{where } \Phi' = \begin{bmatrix} Aair1 & Aair2 & Bair1 \\ 1 & 0 & 0 \\ 0 & 0 & 0 \end{bmatrix}$$

$$G' = \begin{bmatrix} 0 \\ 0 \\ 1 \end{bmatrix} \quad C' = [1\ \ 0\ \ 0] \quad X'(k) = \begin{bmatrix} Gcyl(k) \\ Gcyl(k-1) \\ THcmd(k-1) \end{bmatrix}$$

A difference operator Δ that is defined as $\Delta = 1 - Z^{-1}$ is introduced to define an augmented system as shown by the equation (15). In the augmented system, one additional row is introduced so as to derive an integral term for suppressing a steady-state error.

$$\begin{bmatrix} Gcyl(k+1) \\ \Delta Gcyl(k) \\ \Delta Gcyl(k-1) \\ \Delta THcmd(k) \end{bmatrix} = \begin{bmatrix} 1 & Aair1 & Aair2 & Bair1 \\ 0 & Aair1 & Aair2 & Bair1 \\ 0 & 1 & 0 & 0 \\ 0 & 0 & 0 & 0 \end{bmatrix} \begin{bmatrix} Gcyl(k) \\ \Delta Gcyl(k-1) \\ \Delta Gcyl(k-2) \\ \Delta THcmd(k-1) \end{bmatrix} + \begin{bmatrix} 0 \\ 0 \\ 0 \\ 1 \end{bmatrix} \Delta THcmd(k) \tag{15}$$

$$Gcyl(k) = [1\ \ 0\ \ 0\ \ 0] \begin{bmatrix} Gcyl(k) \\ \Delta Gcyl(k-1) \\ \Delta Gcyl(k-2) \\ \Delta THcmd(k-1) \end{bmatrix}$$

$$\Downarrow$$

$$X'(k+1) = \Phi X'(k) + G \cdot \Delta THcmd(k)$$

$$Gcyl(k) = C \cdot X'(k)$$

$$\Phi = \begin{bmatrix} 1 & Aair1 & Aair2 & Bair1 \\ 0 & Aair1 & Aair2 & Bair1 \\ 0 & 1 & 0 & 0 \\ 0 & 0 & 0 & 0 \end{bmatrix}$$

$$G = \begin{bmatrix} 0 \\ 0 \\ 0 \\ 1 \end{bmatrix}$$

$$C = [1\ \ 0\ \ 0\ \ 0]$$

$$X'(k) = \begin{bmatrix} Gcyl(k) \\ \Delta Gcyl(k-1) \\ \Delta Gcyl(k-2) \\ \Delta THcmd(k-1) \end{bmatrix}$$

The GPC is a technique of causing the controlled variable Gcyl to converge to the desired value Gcyl_cmd in a time period M from a time (k) to a time (k+M). A cost function $J_G$ as shown by the equation (16) is defined, where H is a weighting parameter (>0).

$$J_G = \sum_{j=1}^{M} [\{\text{Gcyl\_cmd}(k+j) - Gcyl(k+j)\}^2 + H\Delta THcmd(k+j-1)^2] \tag{16}$$

A control input ΔTHcmd that minimize the cost function $J_G$ can be determined by using the principle of optimality. The control input Δ THcmd is expressed as shown by the equation (17) by using solution P of the Riccati equation (18).

$$\Delta THcmd(k) = -D(M)\cdot G^T\cdot P(M-1)\Phi X'(k) + D(M)G^T[C^T, \xi^T(M-2)C^T, \xi^T(M-2)\xi^T(M-3)C^T, \ldots\ldots, \xi^T(M-2)\xi^T(M-3)\ldots\xi^T(0)C^T]\text{Gcyl\_cmd}(k) \quad (17)$$

where $$\text{Gcyl\_cmd}(k) = [\text{Gcyl\_cmd}(k+1), \text{Gcyl\_cmd}(k+2), \text{Gcyl\_cmd}(k+3), \ldots, \text{Gcyl\_cmd}(k+M)]$$

$$P(M-j) = \Phi^T P(M-(j+1))\Phi - \Phi^T P(M-(j+1))GD(M)G^T P(M-(j+1))\Phi + C^T C \quad (18)$$

where $$D(M-j) = [H + G^T P(M-(j+1))G\}^{-1}$$

$$\xi(M-(j+1)) = \Phi - GD(M-j)G^T P(M-(j+1))\Phi$$

$$j = M-1, M-2, \ldots, 1$$

By defining initial conditions as shown in the equation (19), P and D are recursively obtained.

$$P(0)=C^T C$$

$$D(1)=[H+G^T P(0)G]^{-1} \quad (19)$$

In case of M=1 (when a one-step-ahead desired value is available), the equation (16) is expressed as shown by the equation (20) and the equation (17) is expressed as shown by the equation (21).

$$J_G = \{\text{Gcyl\_cmd}(k+1) - Gcyl(k+1)\}^2 + H\Delta THcmd(k)^2 \quad (20)$$

$$\begin{aligned}\Delta THcmd(k) &= -D(1)G^T P(0)\Phi X'(k) + D(1)G^T C^T \text{Gcyl\_cmd}(k+1) \\ &= -[H + G^T P(0)G]^{-1} G^T P(0)\Phi X'(k) + [H + G^T P(0)G]^{-1} G^T C^T \text{Gcyl\_cmd}(k+1)\end{aligned} \quad (21)$$

The feedback coefficients for X'(k) and Gcyl_cmd(k+1) in the equation (21) are calculated.

$$P(0) = C^T C = \begin{bmatrix}1\\0\\0\\0\end{bmatrix}[1\ 0\ 0\ 0] = \begin{bmatrix}1&0&0&0\\0&0&0&0\\0&0&0&0\\0&0&0&0\end{bmatrix} \quad (22)$$

-continued $$G^T P(0)G = [0\ 0\ 0\ 1]\begin{bmatrix}1&0&0&0\\0&0&0&0\\0&0&0&0\\0&0&0&0\end{bmatrix}\begin{bmatrix}0\\0\\0\\1\end{bmatrix} = 0$$

$$\Downarrow$$

$$[H + G^T P(0)G]^{-1} G^T P(0)\Phi = [0\ 0\ 0\ 0]$$

$$[H + G^T P(0)G]^{-1} G^T C^T = 0$$

$$\Downarrow$$

$$\Delta THcmd(k) = -[0\ 0\ 0\ 0]X'(k) + 0\text{Gcyl\_cmd}(k+1)$$

Thus, when elements in the first row of the G and G' vectors are zero due to the dead time, performing such conventional GPC does not implement a feasible intake air amount feedback controller 23.

1.3 Structure of Intake Air Amount FB Controller

Figure 3:
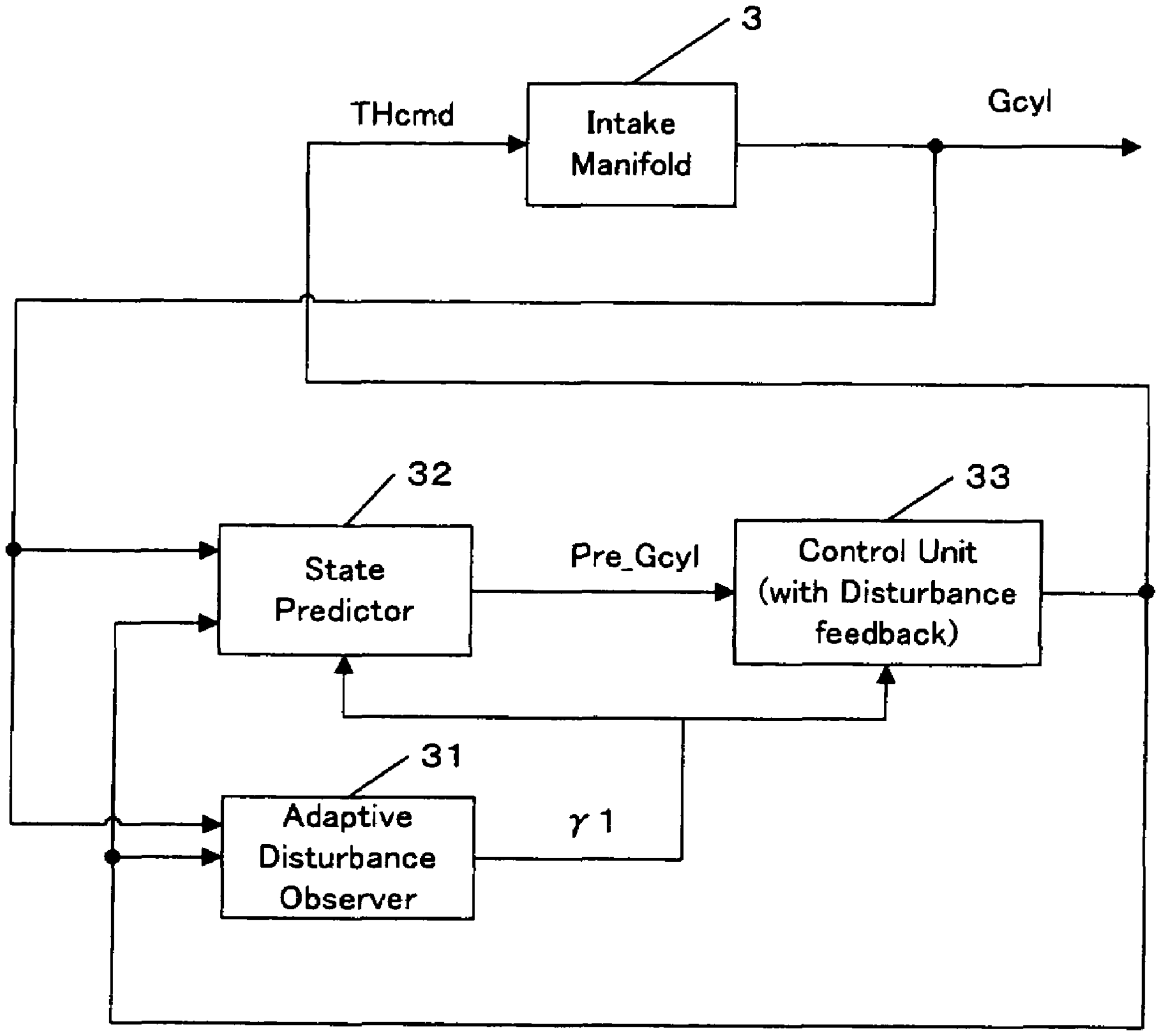
FIG. 3 shows a structure of an intake air amount feedback control in accordance with one embodiment of the present invention.

FIG. 3 shows a structure of the intake air amount feedback controller 23 in accordance with one embodiment of the present invention. According to the present invention, a feasible intake air amount feedback control using a preview control is implemented by constructing the intake air amount FB controller 20 as shown in FIG. 3.

The intake air amount FB controller 23 comprises an adaptive disturbance observer 31, a state predictor 32 and a control unit 33. The adaptive disturbance observer 31 identifies an estimated value γ1 for disturbance that is applied to the intake manifold 3. The state predictor 32 calculates a predicted value Pre_Gcyl for the output of the intake manifold 3, which is a plant, by using the estimated disturbance γ1. Through a preview control algorithm using the predicted value Pre_Gcyl, the control unit 33 calculates a desired throttle opening angle THcmd, which is a control input to the plant. The control input THcmd includes a value obtained by multiplying the estimated disturbance γ1 by a predetermined gain. The output Gcyl of the plant can converge to a desired value by causing the predicted value Pre_Gcyl to converge to a desired value.

The above problem that the elements of the first row of the G and G' vectors become zero is prevented by introducing the state predictor 32. The state predictor 32 will be described.

Since a value required to compensate for the dead time dth caused by the electronic control throttle valve is Gcyl(k+dth−1), the model equation (13) for the dynamic behavior of intake air is shifted by (dth−1) steps to the future.

$$Gcyl(k+dth-1)=Aair1\cdot Gcyl(k+dth-2)+Aair2\cdot Gcyl(k+dth-3)+Bair1\cdot THcmd(k-1) \quad (23)$$

The equation (23) includes future values Gcyl(k+dth−2) and Gcyl(k+dth−3) which cannot be observed. Therefore, these future values are erased. Such erasure may be achieved by recursive calculation as follows. The equation (24) represents a prediction equation for the intake air amount Gcyl.

$$\text{Gcyl}(k+1) = \text{Aair1}\cdot\text{Gcyl}(k) + \text{Aair2}\cdot\text{Gcyl}(k-1) + \text{Bair}\cdot\text{THcmd}(k-dth+1) \quad \text{(a)} \tag{24}$$

$$\Downarrow$$

$$\text{Gcyl}(k+2) = \text{Aair1}\cdot\text{Gcyl}(k+1) + \text{Aair2}\cdot\text{Gcyl}(k) + \text{Bair}\cdot\text{THcmd}(k-dth+2)$$

$$\Downarrow \text{ substitute the above equation (a) into Gcyl(k + 1)}$$

$$\text{Gcyl}(k+2) = \text{Aair1}\cdot(\text{Aair1}\cdot\text{Gcyl}(k) + \text{Aair2}\cdot\text{Gcyl}(k-1) + \text{Bair}\cdot\text{THcmd}(k-dth+1)) + \text{Aair2}\cdot\text{Gcyl}(k) + + \text{Bair}\cdot\text{THcmd}(k-dth+2)$$

...

$$\Downarrow$$

$$\text{Gcyl}(k+dth-1) = \alpha\text{air1}\cdot\text{Gcyl}(k) + \alpha\text{air2}\cdot\text{Gcyl}(k-1) + + \beta\text{air1}\cdot\text{THcmd}(k-1) + \beta\text{air2}\cdot\text{THcmd}(k-2) +, \ldots, + \beta_{airdth-1}\cdot\text{THcmd}(k-dth+1)$$

where $$\begin{bmatrix} \alpha\text{air1} & \alpha\text{air2} \\ * & * \end{bmatrix} = \begin{bmatrix} \text{Aair1} & \text{Aair2} \\ 1 & 0 \end{bmatrix}^{dth-1}$$

Assuming $\begin{bmatrix} \text{Aair1} & \text{Aair2} \\ 1 & 0 \end{bmatrix} = A$, $\begin{bmatrix} \text{Bair1} \\ 0 \end{bmatrix} = B$, $[\beta\text{air1}\ \beta\text{air2} \ldots \beta_{airdth-2}\ \beta_{airdth-1}]$ is elements of the first row of $[B\ AB \ldots A^{dth-3}B\ A^{dth-4}B]$ Although the GPC is a control theory using the principle of optimality, the GPC does not have sufficient robustness against modeling errors and prediction errors because the GPC is not designed to consider such errors. According to one embodiment of the invention, the estimated disturbance γ1 is included in the prediction equation (24) so as to compensate for modeling errors and prediction errors. The state predictor 32 calculates the equation (25) to determine the predicted value Pre_Gcyl.

$$\begin{aligned}\text{Pre\_Gcyl}(k) &= \alpha air1\cdot Gcyl(k) + \alpha air2\cdot Gcyl(k-1) + \\ &\quad \beta air1\cdot THcmd(k-1) + \beta air2\cdot THcmd(k-2) +, \ldots, + \\ &\quad \beta_{airdth-1}\cdot THcmd(k-dth+1) + \gamma 1(k) \\ &\cong Gcyl(k+dth-1)\end{aligned} \tag{25}$$

Calculation of the predicted value by the state predictor 32 allows the dead time to be compensated for, thereby enhancing a quick response of the intake air amount control. Since the estimated disturbance γ1 is included in the predicted value, a steady-state error between the output Gcyl of the intake manifold (which is an object to be controlled) and the predicted value Pre_Gcyl can be eliminated.

The estimated disturbance γ1 is identified by the adaptive disturbance observer 31. The adaptive disturbance observer 31 calculates the equation (26) to determine the estimated disturbance γ1.

$$\gamma 1(k) = \gamma 1(k-1) + \frac{Pdov(k-1)}{1 + Pdov(k-1)}\cdot \text{e\_dov}(k) \tag{26}$$

where $$\text{e\_dov}(k) = Gcyl(k) - \text{Gcyl\_hat}(k)$$

-continued $$\begin{aligned}\text{Gcyl\_hat}(k) &= \alpha air1\cdot Gcyl(k-dth+1) + \alpha air2\cdot Gcyl(k-dth) + \\ &\quad \beta air1\cdot THcmd(k-dth) + \beta air2\cdot THcmd(k-dth-1) +, \\ &\quad \ldots, + \beta_{airdth-1}\cdot THcmd(k-2dth+2) + \gamma 1(k-1)\end{aligned}$$

$$Pdov(k) = \frac{1}{\lambda_1}\left(1 - \frac{\lambda_2 Pdov(k-1)}{\lambda_1 + \lambda_2 Pdov(k-1)}\right)Pdov(k-1)$$

As apparent from the equation (26), the adaptive disturbance observer 31 calculates a predicted value Gcyl_hat(k) for a current cycle in a similar way to the prediction equation (25). The adaptive disturbance observer 31 calculates an error e_dov between the predicted value Gcyl_hat(k) and the actually detected value Gcyl(k). A recursive identification algorithm is used to calculate the estimated disturbance γ1 so that the error e_dov converges to zero. By using the recursive identification algorithm, the estimated disturbance can be quickly and steadily identified. Further, even when noise is included in the output of the intake manifold 3 which is a controlled object, variations in the estimated disturbance caused by such noise can be suppressed by the effect of the statistical process by the recursive identification algorithm.

λ1 and λ2 are weighting parameters. The recursive identification algorithm is a least square method in case of λ1=1 and λ2=1, a weighted least square method in case of λ1<1 and λ2=1, a fixed gain method in case of λ1=1 and λ2=0, and a gradually-decreasing gain method in case of λ=1 and λ2<1.

Next, the control unit 33 will be described. The equation (27) is obtained by shifting the prediction equation (25) by one step to the future and then converting it to include future values. Such conversion to include the future values can be achieved by reversing the conversion process from the equation (23) to the equation (24).

$$\begin{aligned}\text{Pre\_Gcyl}(k) &= \alpha air1\cdot Gcyl(k) + \alpha air2\cdot Gcyl(k-1) + \\ &\quad \beta air1\cdot THcmd(k-1) + \beta air2\cdot \\ &\quad THcmd(k-2) +, \ldots, +\beta_{airdth-1}\cdot \\ &\quad THcmd(k-dth+1) + \gamma 1(k) \\ &\cong Gcyl(k+dth-1)\end{aligned} \tag{27}$$

$$\Downarrow$$

$$\begin{aligned}Gcyl(k+dth) &\cong \alpha air1\cdot Gcyl(k+1) + \alpha air2\cdot Gcyl(k) + \\ &\quad \beta air1\cdot THcmd(k) + \beta air2\cdot \\ &\quad THcmd(k-1) +, \ldots, +\beta_{airdth-1}\cdot \\ &\quad THcmd(k-dth+2) + \gamma 1(k+1)\end{aligned}$$

$$\Downarrow$$

-continued $$\begin{aligned}Gcyl(k+dth) &\cong Aair1\cdot Gcyl(k+dth-1) + Aair2\cdot \\ &\quad Gcyl(k+dth-2) + Bair1\cdot \\ &\quad THcmd(k) + \gamma 1(k+1)\end{aligned}$$

A difference operator Δ that is defined as $\Delta=1-Z^{-1}$ is introduced to define an augmented system as shown by the equation (28). Egc is an error between the actual intake air amount Gcyl and a desired value Gcyl_cmd for the intake air amount. One additional row is specified in the augmented system so as to derive an integral term that suppresses a steady-state error. It is assumed that a variation in the disturbance is constant (that is, $\Delta\gamma 1(k)=\Delta\gamma 1(k+1)$).

$$\tag{28}$$

$$\begin{aligned}&Gcyl(k+dth) = \\ &\quad Aair1\cdot Gcyl(k+dth-1) + Aair2\cdot Gcyl(k+dth-2) + Bair1\cdot THcmd(k) + \gamma l(k+1) \\ &Egc(k) = Gcyl(k) - Gcyl\_cmd(k)\end{aligned}$$

$$\Downarrow$$

$$\begin{aligned}&\Delta Gcyl(k+dth) = \\ &\quad Aair1\cdot \Delta Gcyl(k+dth-1) + Aair2\cdot \Delta Gcyl(k+dth-2) + Bair1\cdot \Delta THcmd(k) + \Delta\gamma l(k+1) \\ &Egc(k) = Ehc(k-1) + \Delta Egc(k) \\ &\quad = Egc(k-1) + \Delta Gcyl(k) - \Delta Gcyl\_cmd(k) \\ &\quad = Egc(k-1) + Aair1\cdot \Delta Gcyl(k-1) + Aair2\cdot \Delta Gcyl(k-2) + \\ &\qquad Bair1\cdot \Delta THcmd(k-dth) + \Delta\gamma l(k-dth+1) - \Delta Gcyl\_cmd(k)\end{aligned}$$

$$\Downarrow$$

$$\begin{bmatrix} Egc(k+dth) \\ \Delta Gcyl(k+dth) \\ \Delta Gcyl(k+dth-1) \end{bmatrix} = \begin{bmatrix} 1 & Aair1 & Aair2 \\ 0 & Aair1 & Aair2 \\ 0 & 1 & 0 \end{bmatrix} \begin{bmatrix} Egc(k+dth-1) \\ \Delta Gcyl(k+dth-1) \\ \Delta Gcyl(k+dth-2) \end{bmatrix} + \begin{bmatrix} Bair1 \\ Bair1 \\ 0 \end{bmatrix} \Delta THcmd(k) + \begin{bmatrix} 1 \\ 1 \\ 0 \end{bmatrix} \Delta\gamma l(k+1) + \begin{bmatrix} -1 \\ 1 \\ 0 \end{bmatrix} \Delta Gcyl\_cmd(k+dth)$$

$$\Downarrow \Delta\gamma l(k+1) = \Delta\gamma l(k)$$

$$\begin{bmatrix} Egc(k+dth) \\ \Delta Gcyl(k+dth) \\ \Delta Gcyl(k+dth-1) \end{bmatrix} = \begin{bmatrix} 1 & Aair1 & Aair2 \\ 0 & Aair1 & Aair2 \\ 0 & 1 & 0 \end{bmatrix} \begin{bmatrix} Egc(k+dth-1) \\ \Delta Gcyl(k+dth-1) \\ \Delta Gcyl(k+dth-2) \end{bmatrix} + \begin{bmatrix} Bair1 \\ Bair1 \\ 0 \end{bmatrix} \Delta THcmd(k) + \begin{bmatrix} 1 \\ 1 \\ 0 \end{bmatrix} \Delta\gamma l(k) + \begin{bmatrix} -1 \\ 1 \\ 0 \end{bmatrix} \Delta Gcyl\_cmd(k+dth)$$

$$\Downarrow$$

$$X(k+1) = \Psi X(k) + \Gamma\Delta THcmd(k) + \Omega\Delta\gamma l(k) + \Theta\Delta Gcyl\_cmd(k+dth)$$

$$X(k) = \begin{bmatrix} Egc(k+dth-1) \\ \Delta Gcyl(k+dth-1) \\ \Delta Gcyl(k+dth-2) \end{bmatrix} \quad \Psi = \begin{bmatrix} 1 & Aair1 & Aair2 \\ 0 & Aair1 & Aair2 \\ 0 & 1 & 0 \end{bmatrix} \quad \Gamma = \begin{bmatrix} Bair1 \\ Bair1 \\ 0 \end{bmatrix}$$

$$\Omega = \begin{bmatrix} 1 \\ 1 \\ 0 \end{bmatrix} \quad \Theta = \begin{bmatrix} -1 \\ 1 \\ 0 \end{bmatrix}$$

A cost function $J_{SG}$ is defined. Assuming that the number of desired preview stages is represented by Nr and the number of disturbance preview stages is represented by Nd, a cost function $J_{SG}$ is defined by using N=Max(Nr, Nd). The number of the desired preview stages Nr is equivalent to the above-described time period M, and specifies a time period during which future values for the desired value Gcyl_cmd are to be used. The number of the disturbance preview stages Nd specifies a time period during which future values for the estimated disturbance γ1, which is calculated by the adaptive disturbance observer 31, are to be used. In the present embodiment, Nd is zero and Nr is one. Accordingly, N=1. The cost function $J_{SG}$ is expressed as shown by the equation (29).

$$J_{SG} = \sum_{j=1}^{N} [X^T(k+j) \cdot Q \cdot X(k+j) + R \cdot \Delta THcmd(k+j-1)^2] \tag{29}$$

$$\Downarrow N = 1$$

$$J_{SG} = X^T(k+1) \cdot Q \cdot X(k+1) + R \cdot \Delta THcmd(k)^2$$

where Q is weighting parameter of Quantity of State X $$Q = \begin{bmatrix} q1 & 0 & 0 \\ 0 & q2 & 0 \\ 0 & 0 & 0 \end{bmatrix} \quad (q1, q2 > 0)$$

R is input weighting parameter

A control input ΔTHcmd that minimizes the cost function $J_{SG}$ is obtained by using the principle of optimality. When the solution Π of the Riccati equation shown in the equation (31) is used, the control input ΔTHcmd is expressed as shown by the equation (30).

$$\Delta THcmd(k) = Fx \cdot X(k) + \sum_{i=1}^{Nr} Fr(j) \cdot \Delta \text{Gcyl\_cmd}(k + dth - 1 + i) + \sum_{i=1}^{Nr} Fd(1) \cdot \Delta\gamma 1(k+1) \tag{30}$$

where:

$$Fx = -\Lambda(N)\Gamma^T\Pi(N-1)\Psi$$

$$Fr(i) = \begin{cases} -\Lambda(N)\Gamma^T\Pi(N-1)\Theta & (i = 1) \\ -\Lambda(N)\Gamma^T\left\{\prod_{m=2}^{i} \zeta^T(N-2)\zeta^T(N-3) \ldots \zeta^T(N-i)\right\}\Pi(N-1)\Theta & (i \geq 2) \end{cases}$$

$$Fd(1) = \begin{cases} -\Lambda(N)\Gamma^T\Pi(N-1)\Omega & (1 = 0) \\ -\Lambda(N)\Gamma^T\left\{\prod_{m=1}^{1} \zeta^T(N-1)\zeta^T(N-2)\zeta^T(N-3) \ldots \zeta^T(N-1)\right\}\Pi(N-1)\Omega & (1 \geq 1) \end{cases}$$

$$\Pi(N-j) = Q + \Psi^T\Pi(N-(j+1))\Psi - \Psi^T\Pi(N-(j+1))\Gamma\Lambda(N)\Gamma^T\Pi(N-(j+1))\Psi \tag{31}$$

$$\Lambda(N-j) = [R + \Gamma^T\Pi(N-(j+1))\Gamma]^{-1}$$

$$\zeta(N-(j+1)) = \Psi - \Gamma\Lambda(N-j)\Gamma^T\Pi(N-(j+1))\Psi$$

$$j = N-1, N-2, \ldots, 1$$

The equation (30) is solved based on the initial conditions of the equation (32). The equation (33) is derived in case of N=1 (that is, Nr=1 and Nd=0).

$$\Pi(0) = Q$$

$$\Lambda(1) = [R + \Gamma^T\Pi(0)\Gamma]^{-1} \tag{32}$$

$$\Delta THcmd(k) = Fx \cdot X(k) + Fr(1)\Delta Gcyl_{cmd}(k+dth) + Fd(0)\Delta\gamma 1(k) \tag{33}$$

where:

$Fx = -\Lambda(1)\Gamma^T\Pi(0)\Psi$ $Fr(1) = -\Lambda(1)\Gamma^T\Pi(0)\Theta$ $Fd(0) = -\Lambda(1)\Gamma^T\Pi(0)\Omega$ Feedback coefficients Fx, Fd and a feedforward coefficient Fr in the equation (33) are calculated as follows.

$$\Lambda(1) = \frac{1}{R + qBair1^2 + q2Bair1^2} \tag{34}$$

$$Fx = \left[\frac{-q1Bair1}{R + q1Bair1^2 + q2Bair1^2} \quad \frac{-(q1+q2)Aair1Bair1}{R + q1Bair1^2 + q2Bair1^2} \quad \frac{-(q1+q2)Aair2Bair1}{R + q1Bair1^2 + q2Bair1^2}\right]$$

$$Fr(1) = \frac{qBair1}{R + q1Bair1^2 + q2Bair1^2}$$

$$Fd(0) = \frac{-(q1+q2)Bair1}{R + q1Bair1^2 + q2Bair1^2}$$

The control input ΔTHcmd in case of N=1 is calculated based on the equations (33) and (34).

$$\begin{aligned} \Delta THcmd(k) &= Fx \cdot X(k) + \\ &\quad Fr(1)\Delta \text{Gcyl\_cmd}(k + dth) + \\ &\quad Fd(0)\Delta\gamma 1(k) \\ &= \frac{-q1Bair1}{R + q1Bair1^2 + q2Bair1^2} Egc(k + dth - 1) + \end{aligned} \tag{35}$$

-continued $$\frac{-(q1+q2)Aair1Bair1}{R+q1Bair1^2+q2Bair1^2}\Delta Gcyl(k+dth-1)+\frac{-(q1+q2)Aair2Bair1}{R+q1Bair1^2+q2Bair1^2}\Delta Gcyl(k+dth-2)+\frac{q1Bair1}{R+q1Bair1^2+q2Bair1^2}\Delta \mathrm{Gcyl\_cmd}(k+dth)+\frac{-(q1+q2)Bair1}{R+q1Bair1^2+q2Bair1^2}\Delta\gamma 1(k)$$

The equation (35) is an equation for calculating the differential ΔTHcmd. The control input THcmd is calculated by integrating the equation (35).

$$THcmd(k)=\frac{-q1Bair1}{R+q1Bair1^2+q2Bair1^2}\sum_{i=0}^{k}Egc(i+dth-1)+\frac{-(q1+q2)Aair1Bair1}{R+q1Bair1^2+q2Bair1^2}Gcyl(k+dth-1)+\frac{-(q1+q2)Aair2Bair1}{R+q1Bair1^2+q2Bair1^2}Gcyl(k+dth-2)+\frac{q1Bair1}{R+q1Bair1^2+q2Bair1^2}\mathrm{Gcyl\_cmd}(k+dth)+\frac{-(q1+q2)Bair1}{R+q1Bair1^2+q2Bair1^2}\gamma 1(k)-\frac{-(q1+q2)Aair1Bair1}{R+q1Bair1^2+q2Bair1^2}Gcyl(0+dth-1)-\frac{-(q1+q2)Aair2Bair1}{R+q1Bair1^2+q2Bair1^2}Gcyl(0+dth-2)-\frac{q1Bair1}{R+q1Bair1^2+q2Bair1^2}\mathrm{Gcyl\_cmd}(0+dth)-\frac{-(q1+q2)Bair1}{R+q1Bair1^2+q2Bair1^2}\gamma 1(0)+THcmd(0) \tag{36}$$

Assuming that initial values of Gcyl(0+dth−1) through Gcyl(0), Gcyl_cmd(0+dth) through Gcyl_cmd(0), γ1(0) and THcmd(0) are zero, the equation (36) is expressed as shown by the equation (37).

$$THcmd(k)=\frac{-q1Bair1}{R+q1Bair1^2+q2Bair1^2}\sum_{i=0}^{k}Egc(i+dth-1)+\frac{-(q1+q2)Aair1Bair1}{R+q1Bair1^2+q2Bair1^2}Gcyl(k+dth-1)+\frac{-(q1+q2)Aair2Bair1}{R+q1Bair1^2+q2Bair1^2}Gcyl(k+dth-2)+\frac{q1Bair1}{R+q1Bair1^2+q2Bair1^2}\mathrm{Gcyl\_cmd}(k+dth)+\frac{-(q1+q2)Bair1}{R+q1Bair1^2+q2Bair1^2}\gamma 1(k) \tag{37}$$

The equation (37) contains future values Gcyl(k+dth−1) and Gcyl(k+dth−2) that cannot be observed at the current time point "k." Instead of these values, predicted values Pre_Gcyl(k) and Pre_Gcyl(k−1) calculated by the state predictor 32 are used. The equation (38) is executed by the control unit 33. Thus, the control input THcmd (k) is generated by the control unit 33.

$$THcmd(k)=\frac{-q1Bair1}{R+q1Bair1^2+q2Bair1^2}\sum_{i=0}^{k}\mathrm{Pre\_Egc}(k)+\frac{-(q1+q2)Aair1Bair1}{R+q1Bair1^2+q2Bair1^2}\mathrm{Pre\_Gcyl}(k)+\frac{-(q1+q2)Aair2Bair1}{R+q1Bair1^2+q2Bair1^2}\mathrm{Pre\_Gcyl}(k-1)+\frac{q1Bair1}{R+q1Bair1^2+q2Bair1^2}\mathrm{Gcyl\_cmd}(k+dth)+\frac{-(q1+q2)Bair1}{R+q1Bair1^2+q2Bair1^2}\gamma 1(k) \tag{38}$$

where $$\mathrm{Pre\_Egc}(k)=\mathrm{Pre\_Gcyl}(k)-\mathrm{Gcyl\_cmd}(k+dth-1)\cong Gcyl(k+dth-1)-\mathrm{Gcyl\_cmd}(k+dth-1)$$

Since a feedback term of the estimated disturbance value γ1 is contained in the control input THcmd, an error between the intake air amount Gcyl and the desired value Gcyl_cmd, which may be caused by the application of disturbance, can quickly converge. Since the feedforward term Gcyl_cmd(k+dth) for the desired value is contained in the control input THcmd, the capability that the intake air amount Gcyl follows the desired value Gcyl_cmd is improved.

1.4 Result of Simulation of Intake Air Amount FB Control

Figure 4:
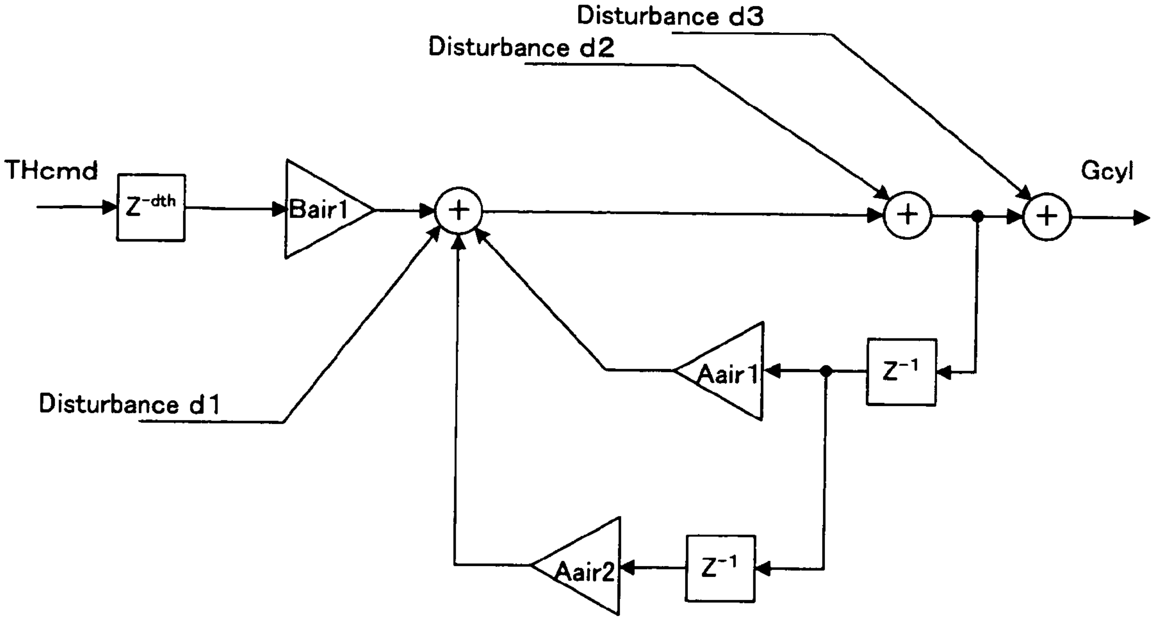
FIG. 4 shows a virtual controlled object in a simulation for an intake air amount feedback control in accordance with one embodiment of the present invention.

FIG. 4 shows a model for a virtual controlled object that is used in a simulation of the intake air amount FB control in accordance with one embodiment of the present invention. The virtual controlled object has a structure that is based on the model equation (13). A control input is a desired throttle opening angle THcmd(k−dth) that is delayed by a time "dth". A control output is an intake air amount Gcyl(k). The intake air amount one cycle ago Gcyl(k−1) and the intake air amount two cycles ago Gcyl(k−2) are fed back.

The simulation is structured to add three disturbances to the virtual controlled object. An input disturbance d1, a state-quantity disturbance d2 and an output disturbance d3 are shown in FIG. 4. The input disturbance d1 includes, for example, a variation in behavior of the throttle valve. The state-quantity disturbance d2 includes, for example, a modeling error. The output disturbance d3 includes, for example, noise of sensors.

Table 1 shows conditions of case G-1 through G-5 performed in the simulation.

TABLE 1

| case number | disturbance d1, d2, d3 | use of the F/B term for the estimated disturbance γ 1 in the control unit 33 | use of the estimated disturbance γ 1 in state predictor 32 | use of the F/F term for the desired value in the control unit 33 |
|---|---|---|---|---|
| G-1 | | ○ | ○ | ○ |
| G-2 | ○ | | | ○ |
| G-3 | ○ | | ○ | ○ |
| G-4 | ○ | ○ | ○ | ○ |
| G-5 | ○ | ○ | ○ | |

Figure 5:
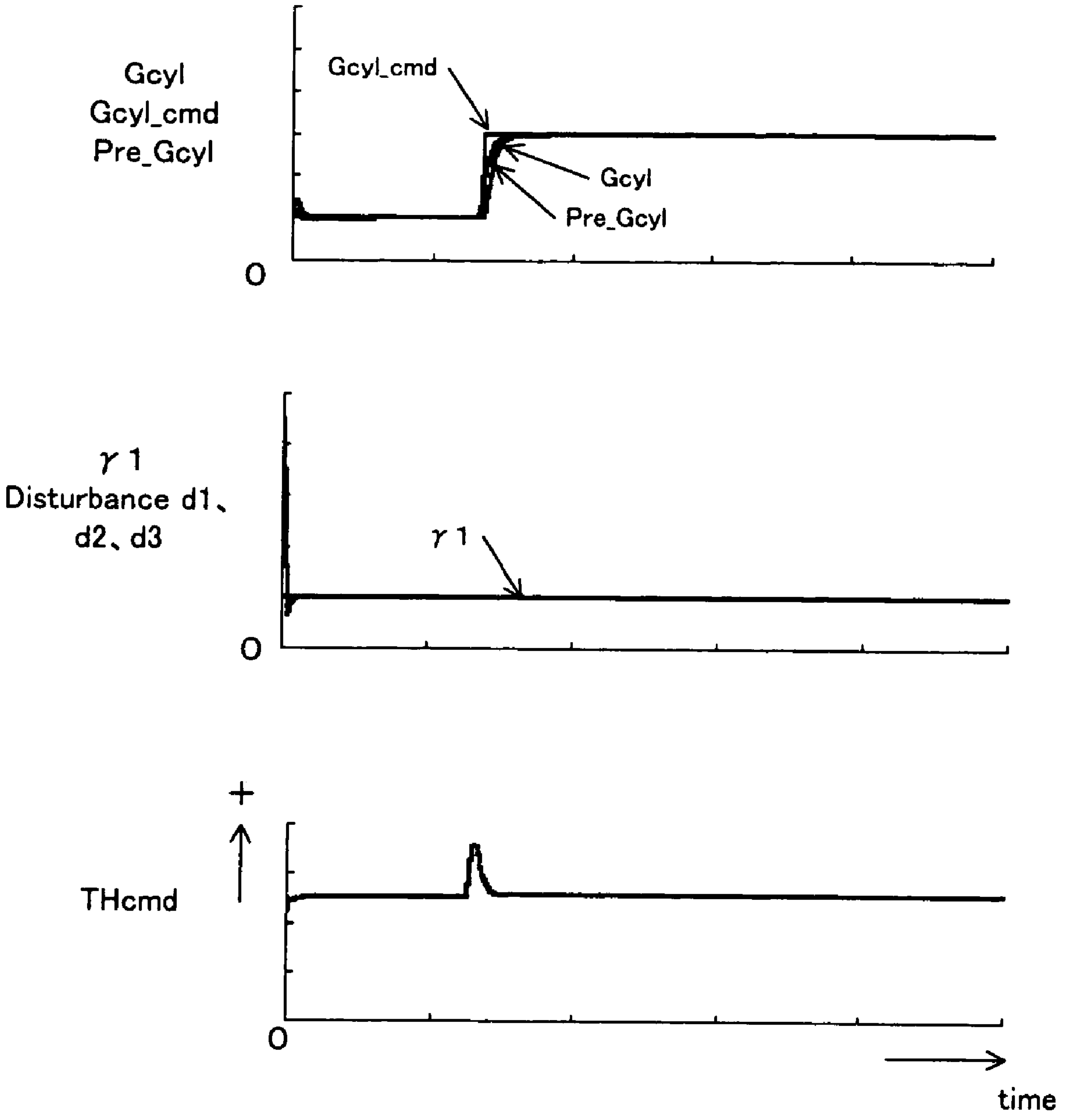
FIG. 5 shows a result of a case G-1 for an intake air amount control simulation in accordance with one embodiment of the present invention.

In the case G-1, no disturbance is added. In the state predictor 32 and the control unit 33, the predicted value Pre_Gcyl and the desired throttle opening angle THcmd are calculated by using the estimated disturbance value γ1. FIG. 5 shows a result of the simulation case G-1. Since there exists no disturbance, there is no error between the predicted value Pre_Gcyl and the actual intake air amount Gcyl. The control unit 33 can cause the intake air amount Gcyl to follow the desired value Gcyl_cmd without generating any overshooting.

Figure 6:
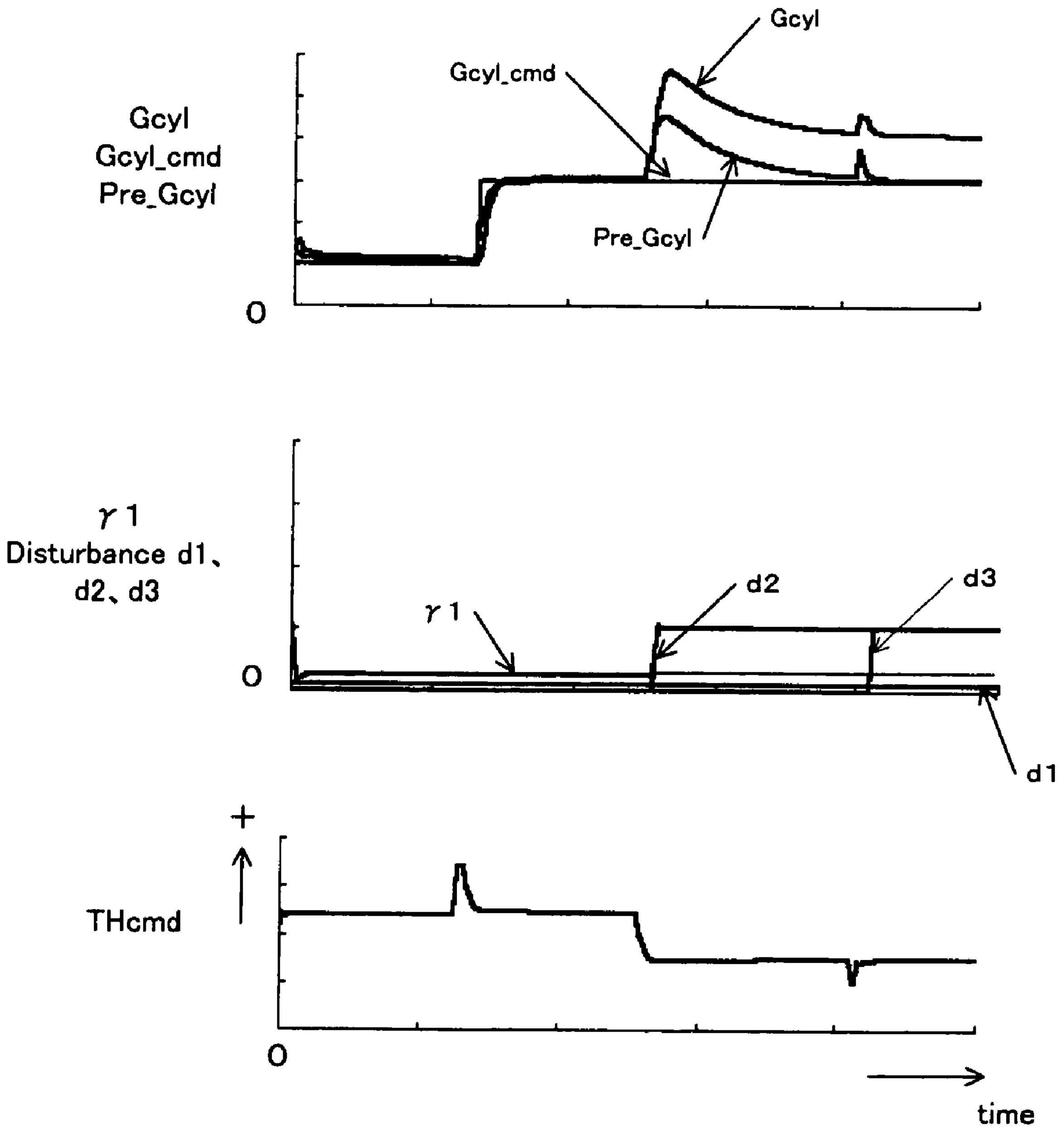
FIG. 6 shows a result of a case G-2 for an intake air amount control simulation in accordance with one embodiment of the present invention.

In the case G-2, the disturbances d1 through d3 are added and the estimated disturbance value γ1 is not used in either the state predictor 32 or the control unit 33. FIG. 6 shows a result of the simulation case G-2. A steady-state error is generated between the predicted value Pre_Gcyl and the actual intake air amount Gcyl due to the disturbance. Since the control input THcmd is calculated based on the predicted value Pre_Gcyl, the control unit 33 cannot cause the intake air amount Gcyl to converge to the desired value Gcyl_cmd.

Figure 7:
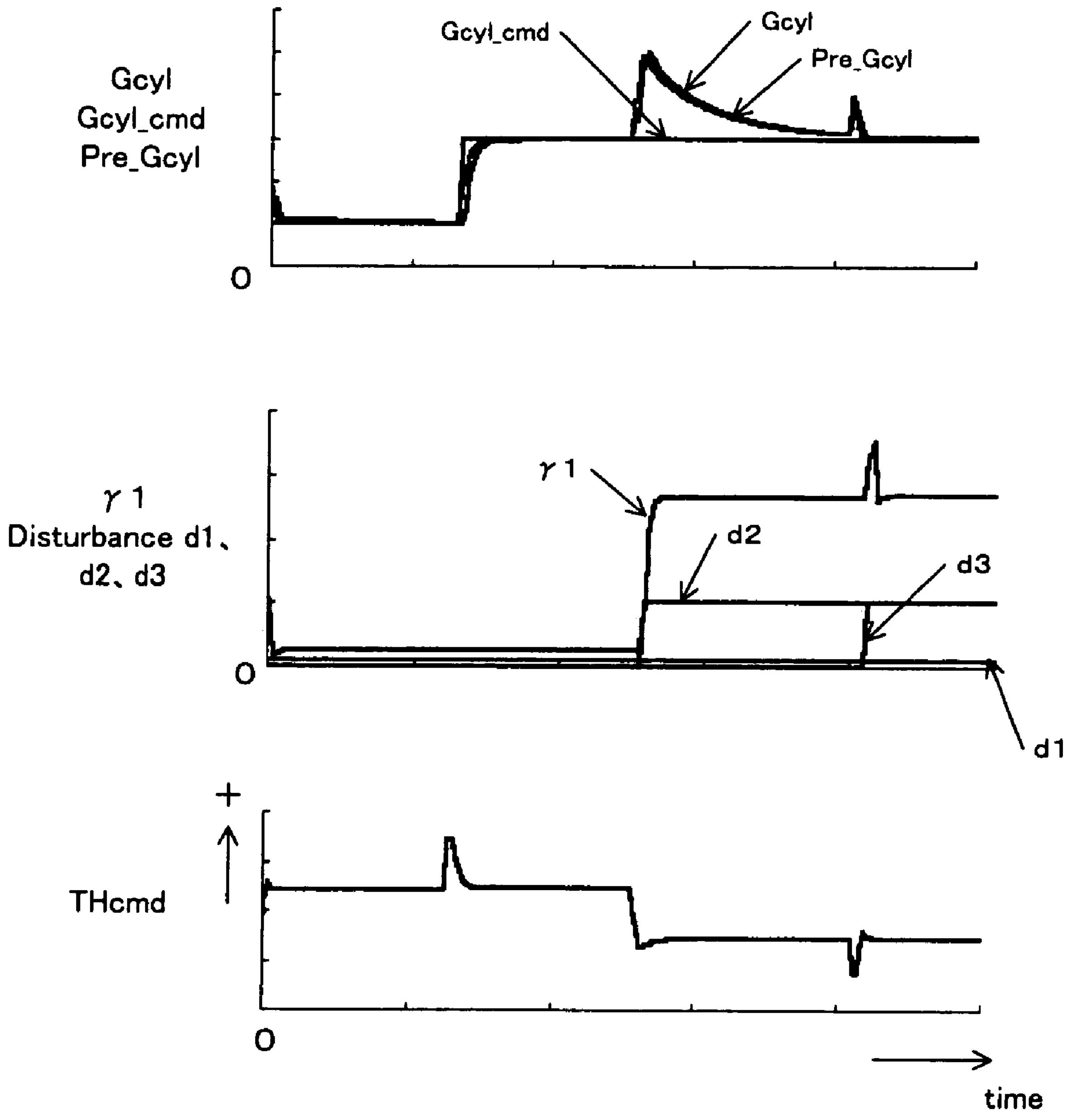
FIG. 7 shows a result of a case G-3 for an intake air amount control simulation in accordance with one embodiment of the present invention.

In the case G-3, the disturbances d1 through d3 are added and the estimated disturbance value γ1 is used in the predictor 32. However, the estimated disturbance value γ1 is not used in the control unit 33. FIG. 7 shows a result of the simulation case G-3. A steady-state error between Pre_Gcyl and Gcyl, which is caused by the disturbances, is removed by the predictor 32. Accordingly, the control unit 33 can cause the intake air amount Gcyl to converge to the desired value Gcyl_cmd. However, a convergence speed is relatively slow since a feedback term based on the estimated disturbance value γ1 is not included in the control input THcmd.

Figure 8:
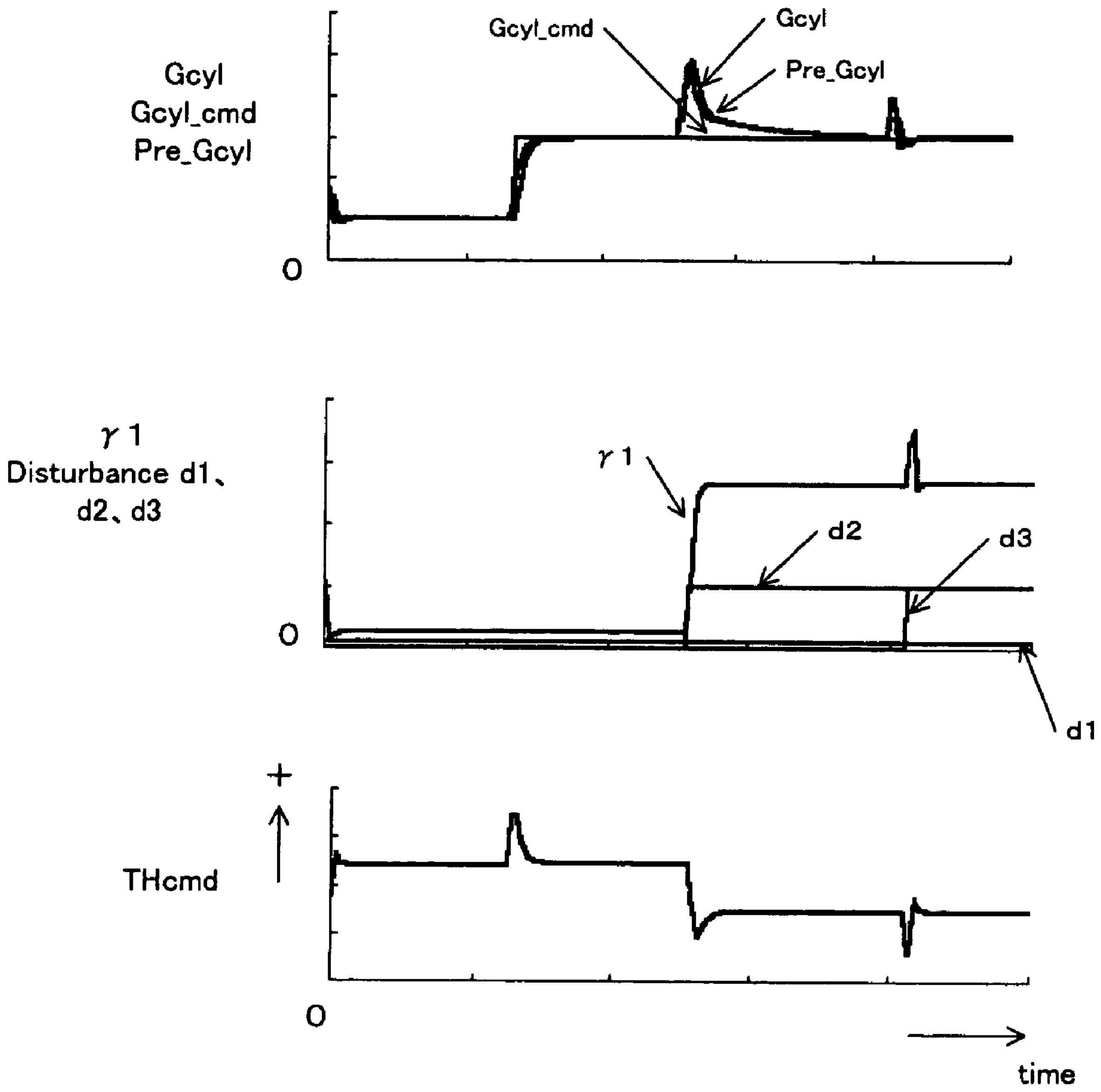
FIG. 8 shows a result of a case G-4 for an intake air amount control simulation in accordance with one embodiment of the present invention.

In the case G-4, the disturbances d1 through d3 are added and the estimated disturbance value γ1 is used in both of the predictor 32 and the control unit 33. The case G-4 corresponds to a preferable embodiment according to the present invention that has been described above referring to FIG. 3. FIG. 8 shows a result of the simulation case G-4. As apparent from comparison with FIG. 7, the case G-4 significantly decreases the time required for the error between the intake air amount Gcyl and the desired value Gcyl_cmd to converge.

Figure 9:
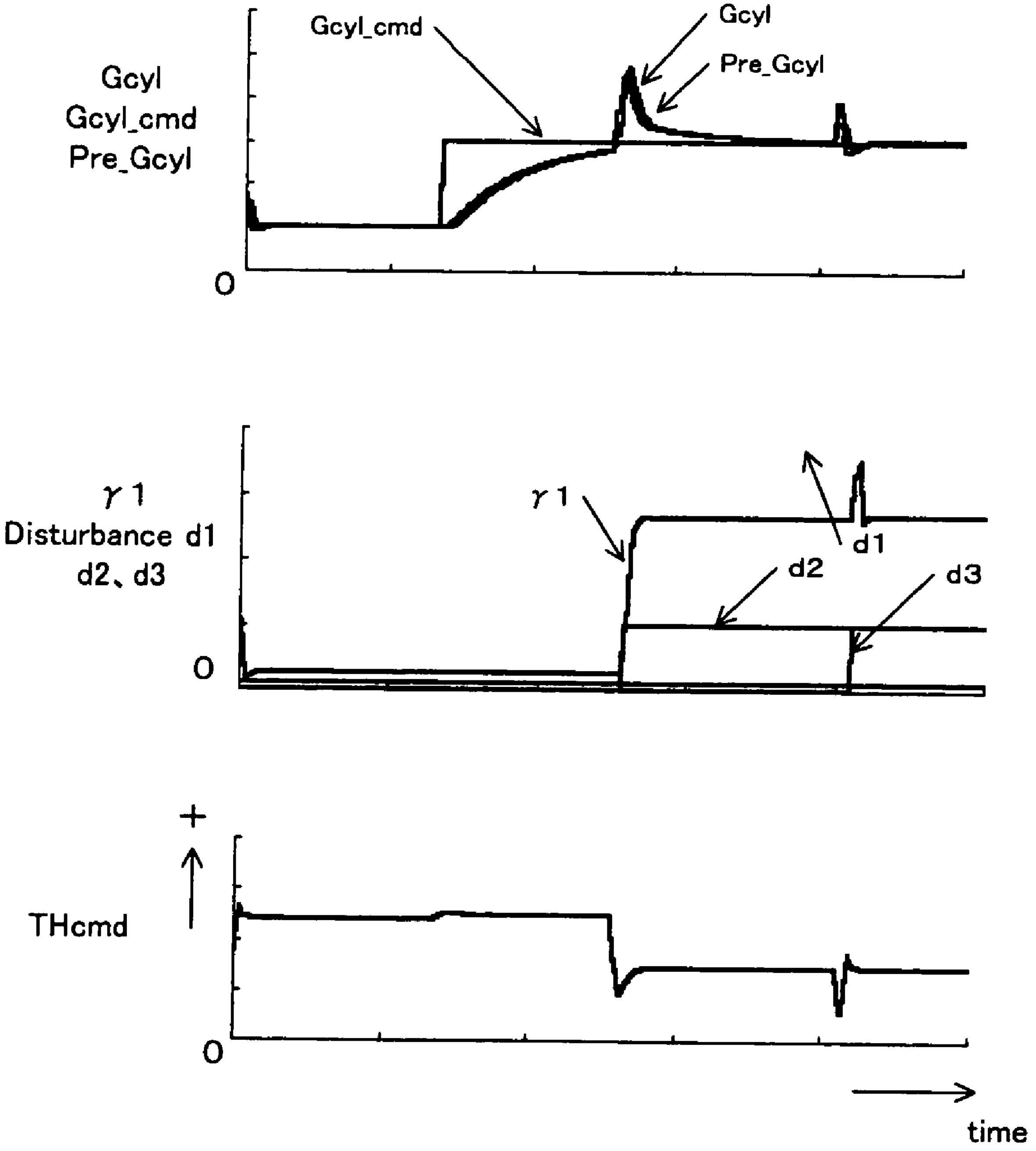
FIG. 9 shows a result of a case G-5 for an intake air amount control simulation in accordance with one embodiment of the present invention.

In the case G-5, the disturbances d1 through d3 are added and the estimated disturbance value γ1 is used in both of the predictor 32 and the control unit 33. However, the feedforward term Gcyl_cmd(k+dth) of the desired value is not included in the control input THcmd. FIG. 9 shows a result of the simulation case G-5. As apparent from comparison with FIG. 8, a speed that the intake air amount Gcyl follows the desired value Gcyl_cmd slows down. This is because it is only an integral term (i.e., Pre_Egc term) that the control input THcmd includes for the error between Gcyl and Gcyl_cmd. Thus, the capability that the intake air amount Gcyl follows the desired value Gcyl_cmd can be improved by including a feedforward term for the desired value in the control input.

Here, a case in which the control model has no dead time will be studied. In such a case, the state predictor 32 may be removed. The model for the dynamic behavior of intake air for controlling the intake air amount Gcyl can be expressed as shown by the equation (39).

$$Gcyl(k+1)=Aair1\cdot Gcyl(k)+Aair2\cdot Gcyl(k-1)+Bair1\cdot THcmd(k) \qquad (39)$$

Since there exists no dead time, the equation (26) performed by the adaptive disturbance observer 31 is expressed by the equation (40).

$$\gamma 1(k)=\gamma 1(k-1)+\frac{Pdov(k-1)}{1+Pdov(k-1)}e\_dov(k) \qquad (40)$$

-continued

ここで、 $e\_dov(k)=Gcyl(k)-Gcyl\_hat(k)$ $$Gcyl\_hat(k)=Aair1\cdot Gcyl(k-1)+Aair2\cdot Gcyl(k-2)+Bair1\cdot THcmd(k-1)+\gamma 1(k-1)$$

$$Pdov(k)=\frac{1}{\lambda_1}\left(1-\frac{\lambda_2 Pdov(k-1)}{\lambda_1+\lambda_2 Pdov(k-1)}\right)Pdov(k-1)$$

Since there exists no dead time, the equation (38) performed by the control unit 33 is expressed by the equation (41).

$$\begin{aligned}THcmd(k)=\;&\frac{-q1Bair1}{R+q1Bair1^2+q2Bair1^2}\sum_{i=0}^{k}Egc(k)+\\&\frac{-(q1+q2)Aair1Bair1}{R+q1Bair1^2+q2Bair1^2}Gcyl(k)+\\&\frac{-(q1+q2)Aair2Bair1}{R+q1Bair1^2+q2Bair1^2}Gcyl(k-1)+\\&\frac{q1Bair1}{R+q1Bair1^2+q2Bair1^2}Gcyl\_cmd(k+dth)+\\&\frac{-(q1+q2)Bair1}{R+q1Bair1^2+q2Bair1^2}\gamma 1(k)\end{aligned} \qquad (41)$$

ここで、 $Egc(k)=Gcyl(k)-Gcyl\_cmd(k)$

As to such a case that includes no dead time, a simulation shown in

Table 2 has been performed.

TABLE 2

| case number | disturbance d1, d2, d3 | use of the F/B term for the estimated disturbance γ 1 in the control unit 33 | use of the F/F term for the desired value in the control unit 33 |
|---|---|---|---|
| G-6 | ○ | ○ | ○ |
| G-7 | ○ | | ○ |

Figure 10:
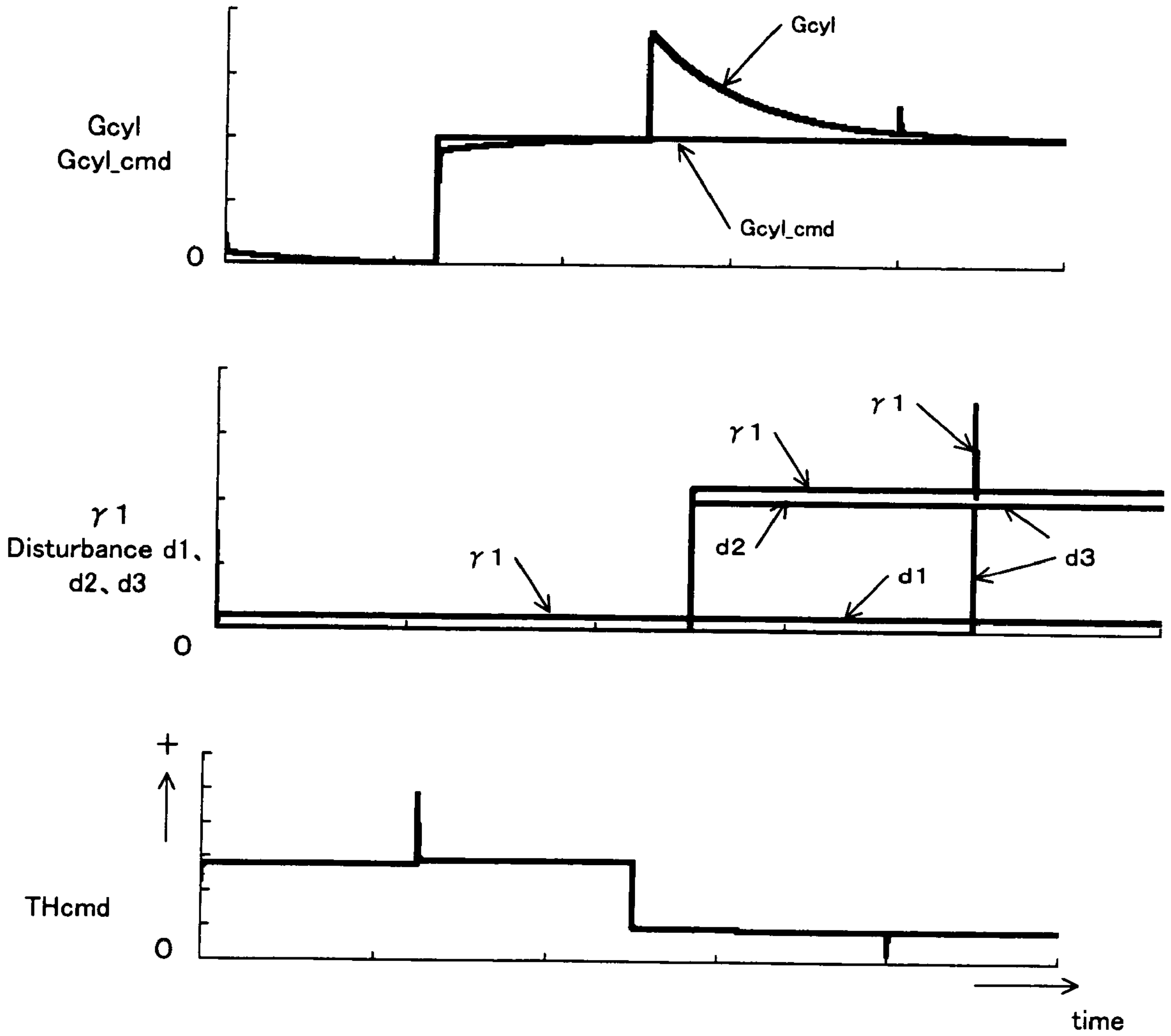
FIG. 10 shows a result of a case G-6 for an intake air amount control simulation in accordance with one embodiment of the present invention.

In the case G-6, the disturbance d1 through d3 are added and the control unit 33 calculates the desired throttle opening angle THcmd by using the estimated disturbance value γ1. The control input THcmd includes the feedforward term Gcyl_cmd(k+dth) of the desired value. FIG. 10 shows a result of the simulation case G-6.

Figure 11:
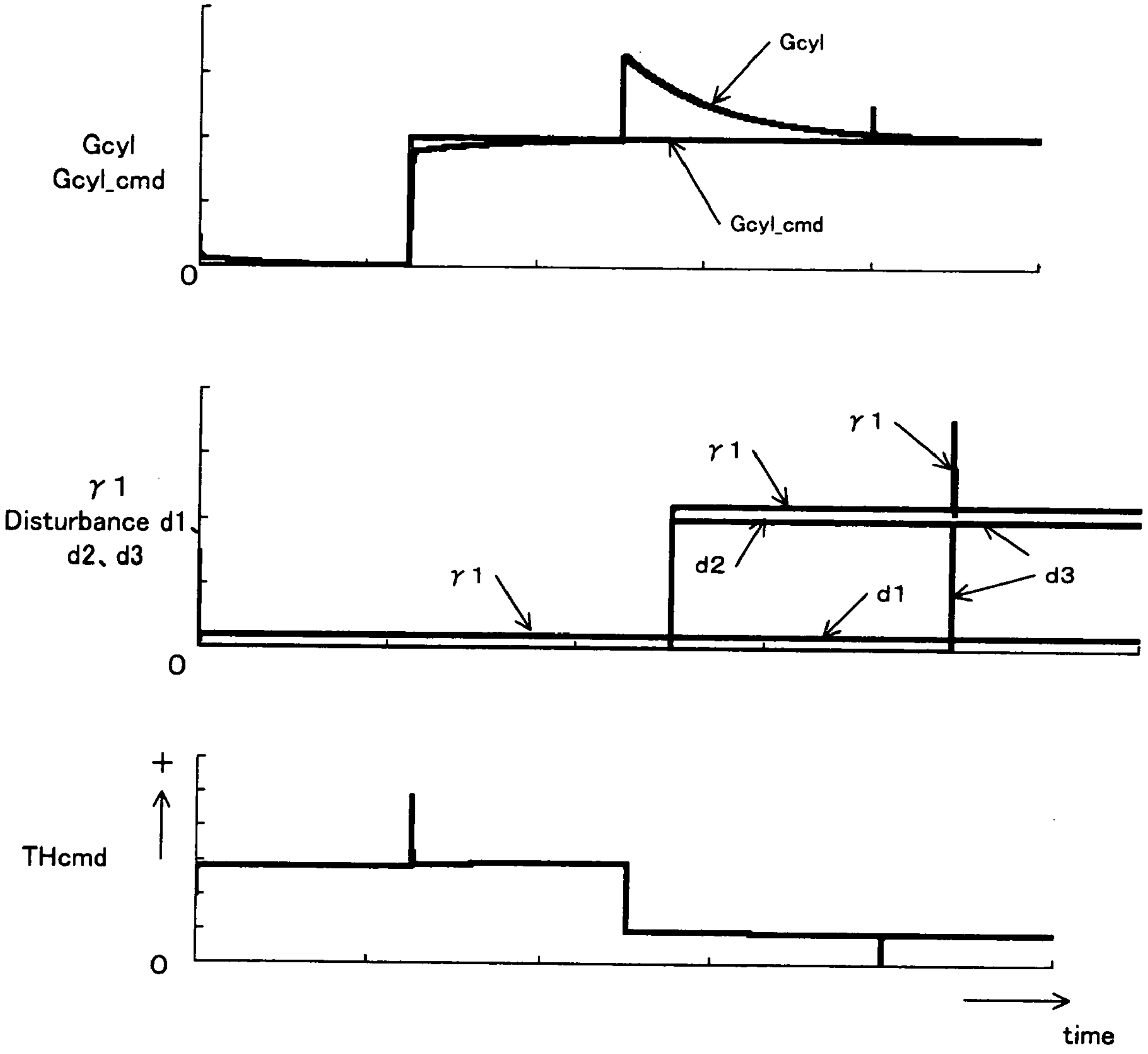
FIG. 11 shows a result of a case G-7 for an intake air amount control simulation in accordance with one embodiment of the present invention.

In the case G-7, the disturbances d1 through d3 are added and the control unit 33 calculates the desired throttle opening angle THcmd without using the estimated disturbance value γ1. The control input THcmd includes the feedforward term Gcyl_cmd(k+dth) of the desired value. FIG. 11 shows a result of the simulation case G-7.

Figure 12:
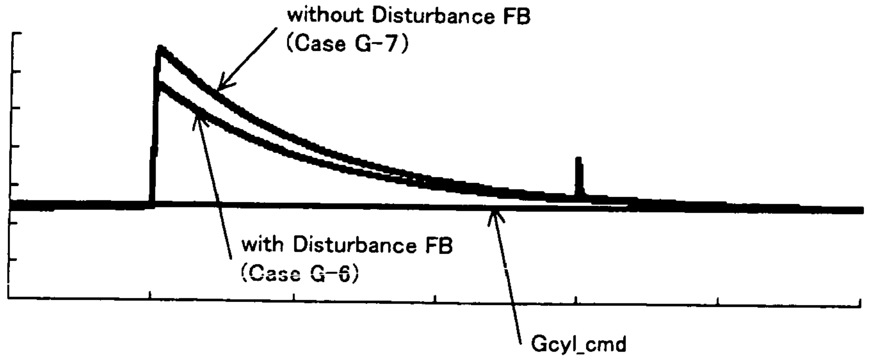
FIG. 12 shows a comparison between the case G-8 and the case G-7 for the intake air amount control simulation in accordance with one embodiment of the present invention.

FIG. 12 shows comparison between the behavior of Gcyl shown in FIG. 10 (case G-6) and the behavior of Gcyl shown in FIG. 11 (case G-7). It is seen that the former is better than the latter from a viewpoint of convergence characteristics. Thus, the convergence characteristics of the controlled variable Gcyl relative to the desired value Gcyl_cmd can be improved by calculating the control input THcmd through the use of the estimated disturbance value γ1 in the control unit 33.

In the embodiments as described above, the adaptive disturbance observer using the recursive identification algorithm is used so as to estimate a disturbance. Alternatively, another appropriate estimator, which may estimate a disturbance referring to a predetermined map or the like, may be used. Further, in the embodiments as described above, the throttle valve is used as a valve for controlling the intake air amount. Alternatively, another valve capable of controlling the intake air amount, for example, a bypass valve, may be used.

2. Rotational Speed Feedback Control

2.1 Modeling of Engine

A scheme of modeling the engine 2 will be described. The engine 2 is represented by a model in which its input is the intake air amount Gcyl and its output is the rotational speed NE.

The equation of motion in an inertial system of the engine is expressed by the equation (42). Here, Ieng denotes inertial moment ($kgm^2$) of the engine, Kne denotes a friction coefficient of the engine, and NE denotes an engine rotational speed (rad/sec). Teng denotes a torque (Nm) of the engine, Tload denotes an equipment-driving torque (Nm) for driving electrical components such as an air-conditioner, a power generator and the like which are mounted on the vehicle. Tdrv denotes a vehicle-driving torque (Nm) for driving the vehicle, which is distributed to a driving system of the vehicle. "t" indicates time.

$$Ieng\cdot \dot{NE}(t)=-Kne\cdot NE(t)+Teng(t)-Tload(t)-Tdrv(t) \quad (42)$$

The engine torque Teng is expressed as shown by the equation (43). Ktrq denotes a torque coefficient, which is determined in accordance with the engine rotational speed NE, an ignition timing IG of the engine and an equivalence ratio λ (a reciprocal of the air/fuel ratio). Gcyl denotes the amount of air (g) that is introduced into the engine.

$$Teng(t)=Ktrq\cdot Gcyl(t) \quad (43)$$

The equation (44) is obtained by substituting the equation (43) into the equation (42). The equation (44) represents a first-order delay system for the rotational speed NE in which its input is the intake air amount Gcyl. "−(Tload+Tdrv)/Ieng" is added as a disturbance term.

$$\dot{NE}(t)=-\frac{Kne}{Ieng}\cdot NE(t)+\frac{Ktrq}{Ieng}\cdot Gcyl(t)+\frac{-1}{Ieng}(Tload(t)+Tdrv(t)) \quad (44)$$

The equation (44) is converted into a discrete-time system to derive the equation (45). "T" denotes the length of the sampling cycle. Each cycle is identified by "k". The equation (45) is a model equation for the inertial system of the engine.

$$NE(k+1)=Ane\cdot NE(k)+Bne\cdot Gcyl(k)+Cne\cdot(Tload(k)+Tdrv(k)) \quad (45)$$

where $$Ane=e^{-\frac{Kne}{Ieng}T}$$

$$Bne=\int_0^T\frac{Ktrq}{Ieng}e^{-\frac{Kne}{Ieng}(T-\tau)}d\tau$$

$$Cne=\int_0^T\frac{-1}{Ieng}e^{-\frac{Kne}{Ieng}(T-\tau)}d\tau$$

Model parameters Ane, Bne and Cne vary in accordance with the rotational speed NE and the throttle opening angle TH. The model parameters based on the rotational speed NE and the throttle opening angle TH may be pre-stored in the memory 1*c* as a map. Alternatively, an identifier may be provided in the control unit to identify these model parameters.110

2.2 Structure of Rotational Speed FB Control Unit

Figure 13:
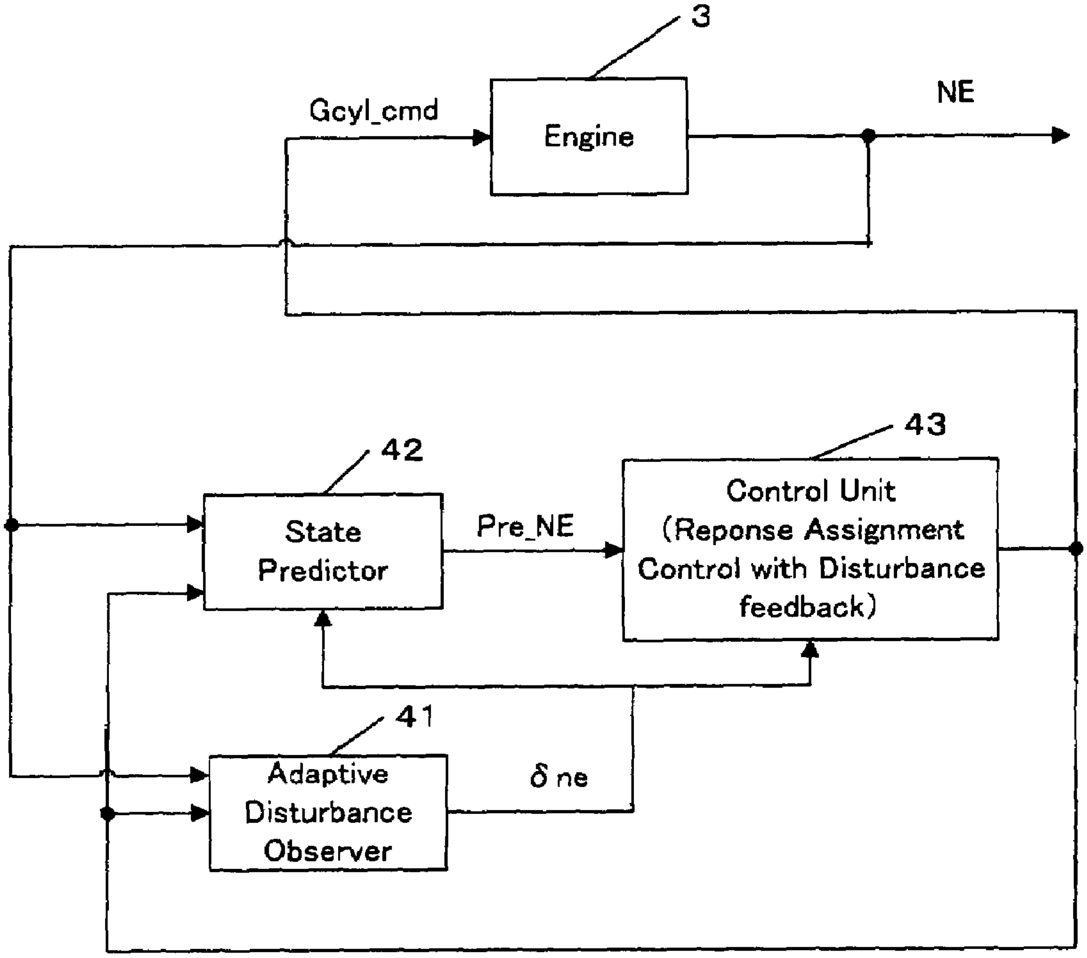
FIG. 13 shows a structure of a rotational speed feedback control in accordance with one embodiment of the present invention.

FIG. 13 shows a block diagram of the rotational speed FB controller 21 in accordance with one embodiment of the present invention. The rotational speed FB controller 21 comprises an adaptive disturbance observer 41, a state predictor 42 and a control unit 43. The adaptive disturbance observer 41 and the state predictor 42 have a similar structure to those shown in FIG. 3 for the intake air amount FB controller 21.

The adaptive disturbance observer 41 identifies an estimated value δne for disturbance that is applied to the engine 2. The state predictor 42 calculates a predicted value Pre_NE for the output (i.e., an engine rotational speed) of the engine, which is a plant, based on the estimated disturbance δne. Through a response assignment control using a predicted value Pre_NE, the control unit 43 calculates a desired intake air amount Gcyl_cmd, which is a control input to the plant. The control input Gcyl_cmd includes a value obtained by multiplying the estimated disturbance δne by a predetermined gain. The output NE of the plant can converge to a desired value by causing the predicted value Pre_NE to converge to a desired value.

The state predictor 42 will be described. As described above referring to FIG. 2, the rotational speed FB controller 21 is disposed upstream of the intake air amount FB controller 23. A dead time is included in the dynamic behavior of intake air of the intake manifold 3. If this dead time is compensated for by both of the rotational speed FB control and the intake air amount FB control, some interference may occur. Therefore, the dead time included in the intake manifold 3 is compensated for by the intake air amount FB controller 23. The intake manifold 3 is regarded as a dead time element from the rotational speed FB controller 21. As a result, Gcyl_cmd(k−dth)=Gcyl(k) is seen from the rotational speed FB controller 21. In other words, the rotational speed FB control unit 21 sees that the intake air amount Gcyl is introduced into the engine when a dead time dth elapses after the calculation of Gcyl_cmd. Accordingly, the model equation (45) of the engine inertial system can be expressed as shown by the equation (46). Here, a disturbance Td indicates a sum of Tload and Tdrv.

$$NE(k+1)=Ane\cdot Ne(k)+Bne\cdot Gcyl\_cmd(k-dth)+Cne\cdot Td(k) \quad (46)$$

In order to compensate for the dead time dth, a control output NE(k+dth) needs to be predicted. The equation (46) is shifted by (dth−1) steps to the future.

$$NE(k+dth)=Ane\cdot Ne(k+dth-1)+Bne\cdot Gcyl\_cmd(k-1)+Cne\cdot Td(k+dth-1) \quad (47)$$

Since the equation (47) includes future values NE(k+dth−1) and Td(k+dth−1) that cannot be observed, these future values are erased. Such erasure can be performed in a similar way to the erasure of the future values from the equation (23) as described above.

$$NE(k+1)=Ane\bullet NE(k)+Bne\bullet Gcyl\_cmd(k-dth)+Cne\bullet Td(k) \quad (a)$$

$$\Downarrow$$

-continued $$NE(k+2)=Ane\bullet NE(k+1)+Bne\bullet Gcyl\_cmd(k-dth+1)+Cne\bullet Td(k+1)$$

$$\Downarrow \quad NE(k+1)$$

$$NE(k+2)=Ane\{Ane\bullet NE(k)+Bne\bullet Gcyl\_cmd(k-dth)+Cne\bullet Td(k)\} +Bne\bullet Gcyl\_cmd(k-dth+1)+Cne\bullet Td(k+1)$$

$$\Downarrow$$

$$\cdots\cdots$$

$$\Downarrow$$

$$\begin{aligned} NE(k+dth)=&Ane^{dth}NE(k) \\ &+Bne\bullet Gcyl\_cmd(k-1)+Ane\bullet Bne\bullet Gcyl\_cmd(k-2)+\ldots+Ane^{dth-1}Bne\bullet Gcyl\_cmd(k-dth) \\ &+Cne\bullet Td(k+dth-1)+Ane\bullet Cne\bullet Td(k+dth-2)+\ldots+Ane^{dth-1}Cne\bullet Td(k) \end{aligned} \tag{48}$$

It is hard to predict Td(k+dth−1) through Td(k) in the equation (48) since they change in accordance with operations of the driver and/or traveling conditions. Therefore, it is assumed that the disturbance Td is constant as shown by the equation (49). According to this assumption, the equation (48) is expressed by the equation (50).

$$Td(k+dth-1)=Td(k+dth-2)=\ldots=Td(k+1)=Td(k) \tag{49}$$

$$\begin{aligned} NE(k+dth)=&Ane^{dth}\cdot NE(k)+ \\ &Bne\cdot \mathrm{Gcyl\_cmd}(k-1)+Ane\cdot Bne\cdot \mathrm{Gcyl\_cmd}(k-2)+ \\ &\ldots+Ane^{dth-1}\cdot Bne\cdot \mathrm{Gcyl\_cmd}(k-dth)+ \\ &(1+Ane+\ldots+Ane^{dth-1})Cne\cdot Td(k) \end{aligned} \tag{50}$$

An estimated disturbance value δne is introduced into the equation (50). The estimated disturbance value δne includes not only an estimation error of the disturbance Td but also other disturbances applied to the plant. The equation (51) is executed by the state estimator 42 to calculate a predicted value Pre_NE of the rotational speed.

$$\begin{aligned} NE(k+dth)\cong&\alpha ne1\cdot NE(k)+\beta ne1\cdot \mathrm{Gcyl\_cmd}(k-1)+ \\ &\beta ne2\cdot \mathrm{Gcyl\_cmd}(k-2)+\ldots\ldots+ \\ &\beta nedth\cdot \mathrm{Gcyl\_cmd}(k-dth)+ \\ &\gamma ne\cdot(Td(k)+\delta ne(k)) \\ =&\mathrm{Pre\_NE}(k) \end{aligned} \tag{51}$$

where $$\alpha ne1=Ane^{dth}$$

$$\beta nej=Ane^{j-1}Bne$$

$$j=1,2,\ldots,dth$$

$$\gamma ne=(1+Ane+\ldots+Ane^{dth-1})Cne$$

By determining the predicted value by the state predictor 42, the dead time is compensated for and hence a quick response of the rotational speed control can be enhanced. Since the predicted value Pre_NE is calculated based on the estimated disturbance δne, a steady-state error between the output NE of the engine (which is a controlled object) and the predicted value Pre_NE is eliminated.

The estimated disturbance δne is identified by the adaptive disturbance observer 41. The adaptive disturbance observer 41 executes the equation (52) to determine the estimated disturbance δne.

$$\delta ne(k)=\delta ne(k-1)+\frac{Pdne(k-1)}{1+Pdne(k-1)}\cdot \mathrm{e\_d}ne(k) \tag{52}$$

where $$\mathrm{e\_dne}=NE(k)-\mathrm{NE\_hat}(k)$$

$$\begin{aligned} \mathrm{NE\_hat}(k)=&\alpha ne1\cdot NE(k-dth)+\beta ne1\cdot \mathrm{Gcyl\_cmd}(k-dth-1)+ \\ &\beta ne2\cdot \mathrm{Gcyl\_cmd}(k-dth-2)+\ldots\ldots+ \\ &\beta nedth\cdot \mathrm{Gcyl\_cmd}(k-2dth)+\gamma ne\cdot Td(k-dth)+\gamma ne\cdot\delta ne(k-1) \end{aligned}$$

$$Pdne(k)=\frac{1}{\lambda_1}\left(1-\frac{\lambda_2 Pdne(k-1)}{\lambda_1+\lambda_2 Pdne(k-1)}\right)Pdne(k-1)$$

As apparent from the equation (52), the adaptive disturbance observer 41 calculates a predicted value NE_hat(k) for the current cycle (this is calculated by shifting the equation (51) by "dth" steps to the past). Here, it is assumed that the estimated disturbance δne is constant; that is, δne(k−dth)=δne(k−1). The adaptive disturbance observer 41 further calculates an error e_dne between the predicted value NE_hat(k) and the actually-detected value NE(k). Thereafter, a recursive identification algorithm is used to calculate the estimated disturbance value δne so that the error e_dne converges to zero.

By using the recursive identification algorithm, the estimated disturbance δne can be quickly and stably estimated. As described above, λ1 and λ2 are weighting parameters, which are determined in accordance with the type of the recursive identification algorithm.

Next, the control unit 43 will be described. The equation (53) is obtained by shifting the prediction expression (51) by one step to the future and then converting it to include future values. Such conversion to include the future values can be achieved by reversing the conversion process from the equation (47) to the equation (48). Here, it is assumed that variations in the future values of the disturbance Td and the estimated disturbance value δne are constant, that is, Td(k+dth)=Td(k) and δne(k+dth)=δne(k).

$$\begin{aligned} \mathrm{Pre\_NE}(k)=&\alpha ne1\cdot NE(k)+\beta ne1\cdot \mathrm{Gcyl\_cmd}(k-1)+ \\ &\beta ne2\cdot \mathrm{Gcyl\_cmd}(k-2)+\ldots+ \\ &\beta nedth\cdot \mathrm{Gcyl\_cmd}(k-dth)+ \\ &\gamma ne(Td(k)+\delta ne(k)) \\ \cong& NE(k+dth) \end{aligned} \tag{53}$$

$$\Downarrow$$

$$\begin{aligned} Ne(k+dth+1)=&\alpha ne1\cdot NE(k+1)+\beta ne1\cdot \mathrm{Gcyl\_cmd}(k)+ \\ &\beta ne2\cdot \mathrm{Gcyl\_cmd}(k-1)+\ldots+ \\ &\beta nedth\cdot \mathrm{Gcyl\_cmd}(k-dth+1)+ \\ &\gamma ne(Td(k+1)+\delta ne(k+1)) \end{aligned}$$

$$\Downarrow$$

$$\begin{aligned} NE(k+dth+1)=&Ane\cdot NE(k+dth)+Bne\cdot \mathrm{Gcyl\_cmd}(k)+ \\ &Cne\cdot(Td(k+dth)+\delta ne(k+dth)) \end{aligned}$$

$$\Downarrow$$

-continued $$NE(k+dth+1)=Ane\cdot NE(k+dth)+Bne\cdot \text{Gcyl\_cmd}(k)+Cne\cdot(Td(k)+\delta ne(k))$$

A switching function σne is defined to perform a response assignment control. The switching function σne allows convergence behavior of the actual rotational speed NE to a desired value NE_cmd for the rotational speed to be specified. E_ne denotes an error between the actual rotational speed NE and the desired value NE_cmd.

$$\sigma ne(k)=E\_ne(k)+S\_ne\cdot E\_ne(k-1) \quad (54)$$

where E_ne(k)=NE(k)−NE_cmd(k)

A control input is determined so that the switching function σne becomes zero.

$$\sigma ne(k)=0 \quad (55)$$
$$\Downarrow$$
$$\text{E\_ne}(k)=-\text{S\_ne}\cdot \text{E\_ne}(k-1)$$

The equation (55) represents a first-order delay system having no input. In other words, the control unit 43 operates to confine the controlled variable E_ne onto such a first-order delay system as shown by the equation (55).

Figure 14:
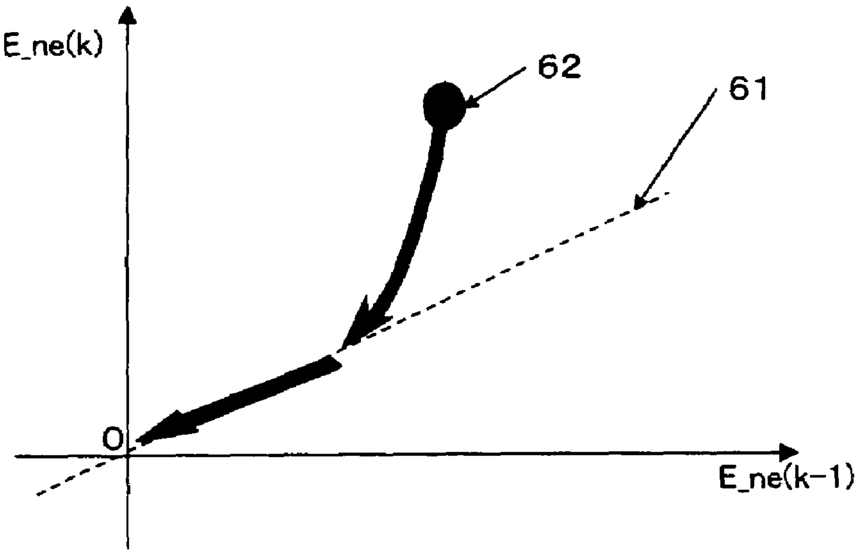
FIG. 14 shows a switching line of a response assignment control in accordance with one embodiment of the present invention.

FIG. 14 shows a phase plane with E_ne(k) being the vertical axis and E_ne(k−1) being the horizontal axis. A switching line 61 expressed by the equation (55) is shown in the phase plane. Assuming that a point 62 is an initial value of a state variable (E_ne(k−1), E_ne(k)), the control unit 43 places the state variable onto the switching line 61 and then confines it on the switching line 61. Since the state variable is confined in the first-order delay system having no input, the state variable can automatically converge to the origin (that is, E_ne(k), E_ne(k−1)=0) of the phase plane with time. By confining the state variable onto the switching line 61, the state quantity can converge to the origin without being affected by disturbances.

A setting parameter S_ne of the equation (55) is established to satisfy −1<S_ne<1. It is preferable that the setting parameter is set to satisfy −1<S_ne<0. This is because the first-order delay system of the equation (55) may become a vibration-stable system when S_ne has a positive value.

Figure 15:
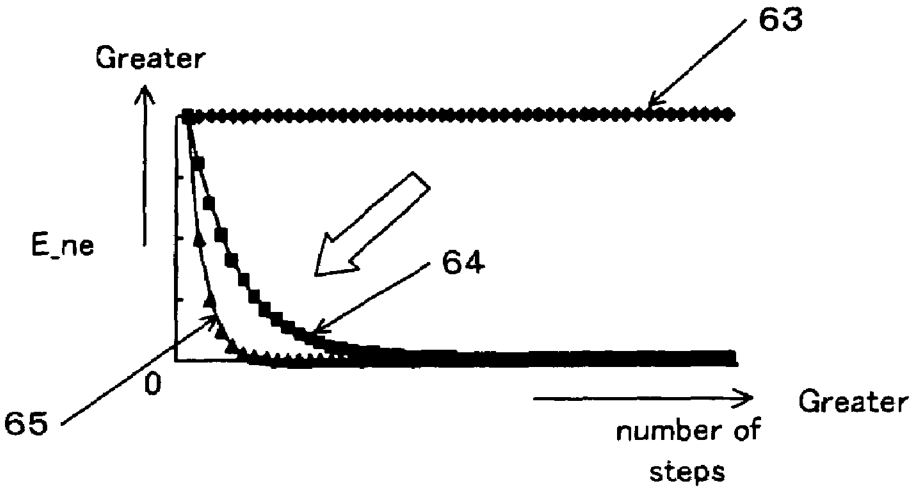
FIG. 15 shows a relation between a convergence speed and the value of a setting parameter of a switching function for a response assignment control in accordance with one embodiment of the present invention.

The setting parameter S_ne is a parameter for specifying a convergence speed of the error E_ne. Referring to FIG. 15, graphs 63, 64 and 65 show a convergence speed in cases of S_ne=−1, −0.8 and −0.5, respectively. As the absolute value of the setting parameter S_ne becomes smaller, the convergence speed of the error E_ne becomes faster.

The control unit 43 calculates a control input Upas in accordance with the equation (56). An equivalent control input Ueq is an input for confining the state variable onto the switching line. A reaching law input Urch is an input for placing the state variable on the switching line.

$$Gcyl_{cmd}(k)=Upas(k)=Ueq(k)+Urch(k) \quad (56)$$

A method for determining the equivalent control input Ueq will be described. The equivalent control input Ueq has a function of holding the state variable at a given position in the phase plane. Therefore, it is required to satisfy the equation (57).

$$\sigma ne(k+dth+1)=\sigma ne(k+dth) \quad (57)$$

Based on the equation (54), the equation (57) is expressed by the equation (58).

$$\text{E\_ne}(k+dth+1)+\text{S\_ne}\cdot\text{E\_ne}(k+dth)=\text{E\_ne}(k+dth)+\text{S\_ne}\cdot\text{E\_ne}(k+dth-1) \quad (58)$$
$$\Downarrow$$
$$NE(k+dth+1)-\text{NE\_cmd}(k+dth+1)+\text{S\_ne}\{NE(k+dth)-\text{NE\_cmd}(k+dth)\}=NE(k+dth)-\text{NE\_cmd}(k+dth)+\text{S\_ne}\{NE(k+dth-1)-\text{NE\_cmd}(k+dth-1)\}$$

The equation (59) can be obtained by substituting the equation (53) into the equation (58).

$$Ane\cdot NE(k+dth)+Bne\cdot\text{Gcyl\_cmd}(k)+Cne\cdot Td(k)+Cne\cdot\delta ne(k)-\text{NE\_cmd}(k+dth+1)+\text{S\_ne}\cdot NE(k+dth)-\text{S\_ne}\cdot\text{NE\_cmd}(k+dth)=NE(k+dth)-\text{NE\_cmd}(k+dth)+\text{S\_ne}\cdot NE(k+dth-1)-\text{S\_ne}\cdot\text{NE\_cmd}(k+dth-1) \quad (59)$$

The control input Ueq(k) is calculated by the equation (60).

$$Ueq(k)=1/Bne\{(1-Ane-\text{S\_ne})NE(k+dth)+\text{S\_ne}\cdot NE(k+dth-1)+\text{NE\_cmd}(k+dth+1)+(\text{S\_ne}-1)\cdot\text{NE\_cmd}(k+dth)-\text{S\_ne}\cdot\text{NE\_cmd}(k+dth-1)-Cne\cdot Td(k)-Cne\cdot\delta ne(k)\} \quad (60)$$

The equation (60) includes future values NE(k+dth) and NE(k+dth−1) which cannot be observed at the current time point "k". Instead of these values, predicted values Pre_NE (k) and Pre_NE(k−1) calculated by the state predictor 42 are used. The control unit 43 executes the equation (61) to determine the equivalent control input Ueq(k).

$$Ueq(k)=1/Bne\{(1-Ane-\text{S\_ne})\text{Pre\_NE}(k)+\text{S\_ne}\cdot\text{Pre\_NE}(k-1)+\text{NE\_cmd}(k+dth+1)+(\text{S\_ne}-1)\cdot\text{NE\_cmd}(k+dth)-\text{S\_ne}\cdot\text{NE\_cmd}(k+dth-1)-Cne\cdot Td(k)-Cne\cdot\delta ne(k)\} \quad (61)$$

Thus, the equivalent control input Ueq includes a disturbance feedback term δne and a disturbance feedforward term Td. Accordingly, the error between the rotational speed NE and the desired value NE_cmd, which may be caused by application of disturbances to the engine 2 or the controlled object, can quickly converge.

The control unit 43 further executes the equation (62) to determine a reaching law input Urch. F denotes a reaching law gain.

$$Urch(k) = \frac{-F}{Bne}\sigma ne(k + dth) \quad (62)$$

where $0 < F < 2$ 2.3 Result of Simulation of Rotational Steed FB Control

Figure 16:
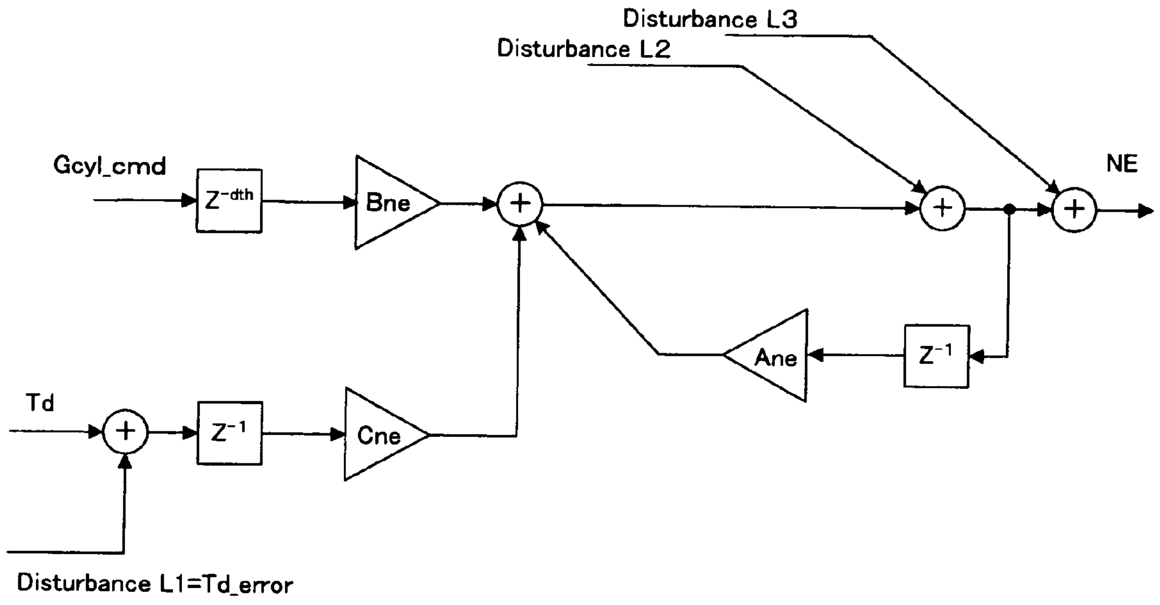
FIG. 16 shows a virtual controlled object in a simulation for a rotational speed feedback control in accordance with one embodiment of the present invention.

FIG. 16 shows a model of a virtual controlled object that is used in a simulation of the rotational speed FB control in accordance with one embodiment of the present invention. The virtual controlled object has a structure that is based on the model equation (46) of the engine. A control input is a desired intake air amount Gcyl_cmd that is delayed by a time "dth". A control output is a rotational speed NE. A driving torque Td is applied to the controlled object as a disturbance. The rotational speed NE one cycle ago is fed back.

The simulation is structured to add three disturbances to the virtual controlled object. Three positions at which an input disturbance L1, a state-quantity disturbance L2 and an output disturbance L3 are to be applied are shown. The input disturbance L1 includes, for example, an estimation error for the driving torque Td. The state-quantity disturbance L2 includes, for example, a modeling error. The output disturbance L3 includes, for example, noise of sensors. Table 3 shows conditions for cases N-1 through N-5 performed in the simulation.

TABLE 3

| case number | Disturbance L1, L2, L3 | use of the F/B term for the estimated disturbance δ ne | use of the F/F term for the driving torque Td | use of the adaptive law input Uadp |
|---|---|---|---|---|
| N-1 | ○ | ○ | ○ | |
| N-2 | ○ | | | |
| N-3 | ○ | | ○ | |
| N-4 | ○ | | | ○ |
| N-5 | ○ | ○ | ○ | ○ |

Figure 17:
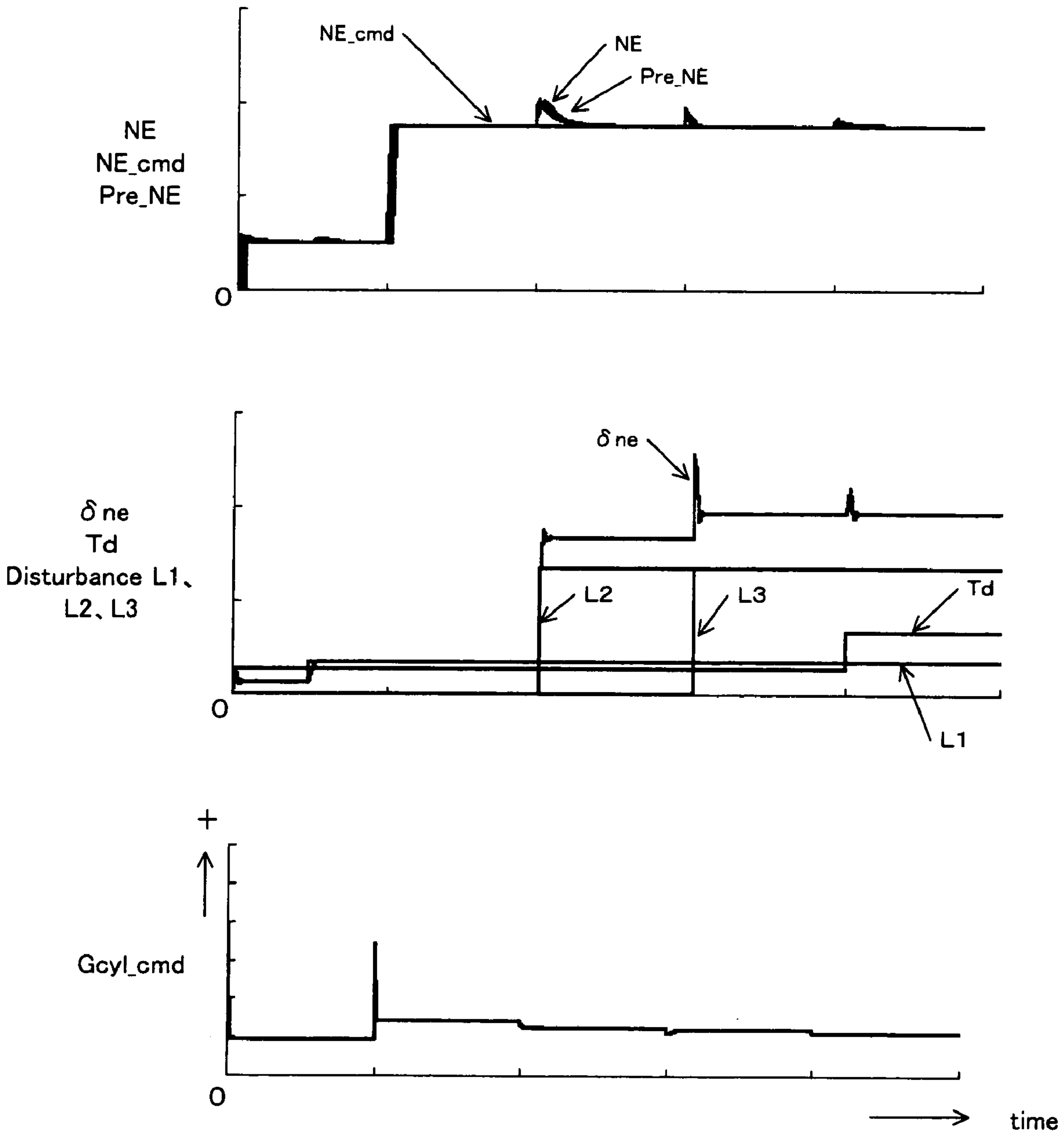
FIG. 17 shows a result of a case N-1 for a rotational speed control simulation in accordance with one embodiment of the present invention.

In the case N-1, the disturbances L1 through L3 are added. The estimated disturbance value δne and the driving torque Td are used in both of the predictor 42 and the control unit 43. The case N-1 is a preferable case based on the rotational speed FB control in FIG. 13 in accordance with one embodiment of the present invention. FIG. 17 shows a result of the simulation case N-1. Under the condition in which the disturbances are applied, the rotational speed NE can converge to the desired value NE_cmd without any steady-state error. A capability that the rotational speed NE follows the desired value NE_cmd when the desired value NE_cmd changes is good.

Figure 18:
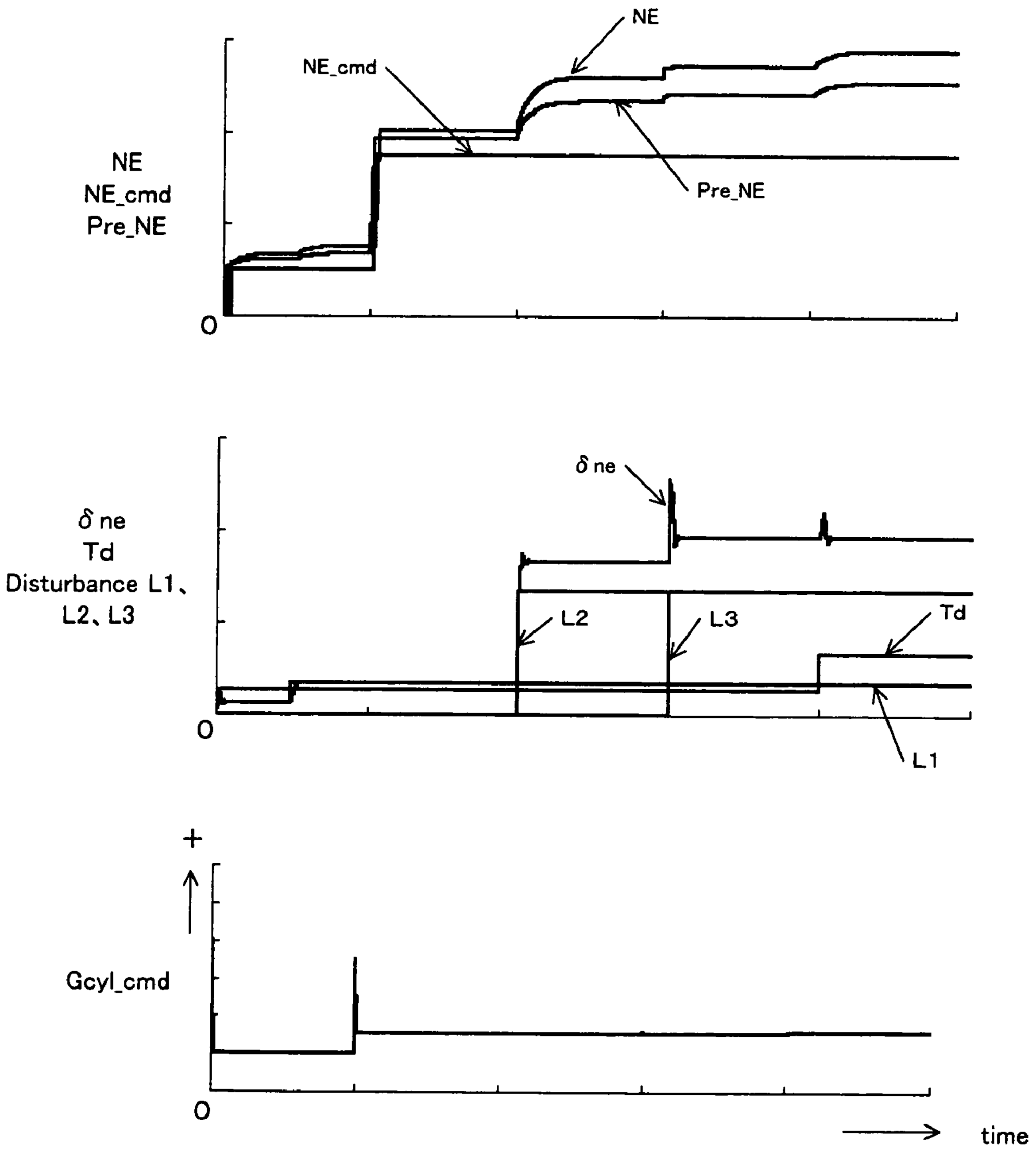
FIG. 18 shows a result of a case N-2 for a rotational speed control simulation in accordance with one embodiment of the present invention.

In the case N-2, the estimated disturbance value δne and the driving torque Td are not used in either the predictor 42 or the control unit 43. FIG. 18 shows a result of the simulation case N-2. A steady-state error occurs between the actual rotational speed NE and the predicted value Pre_NE due to the disturbances. Since the control unit 43 performs the response assignment control based on the predicted value Pre_NE, the control unit 43 cannot cause the actual rotational speed NE to converge to the desired value NE_cmd.

Figure 19:
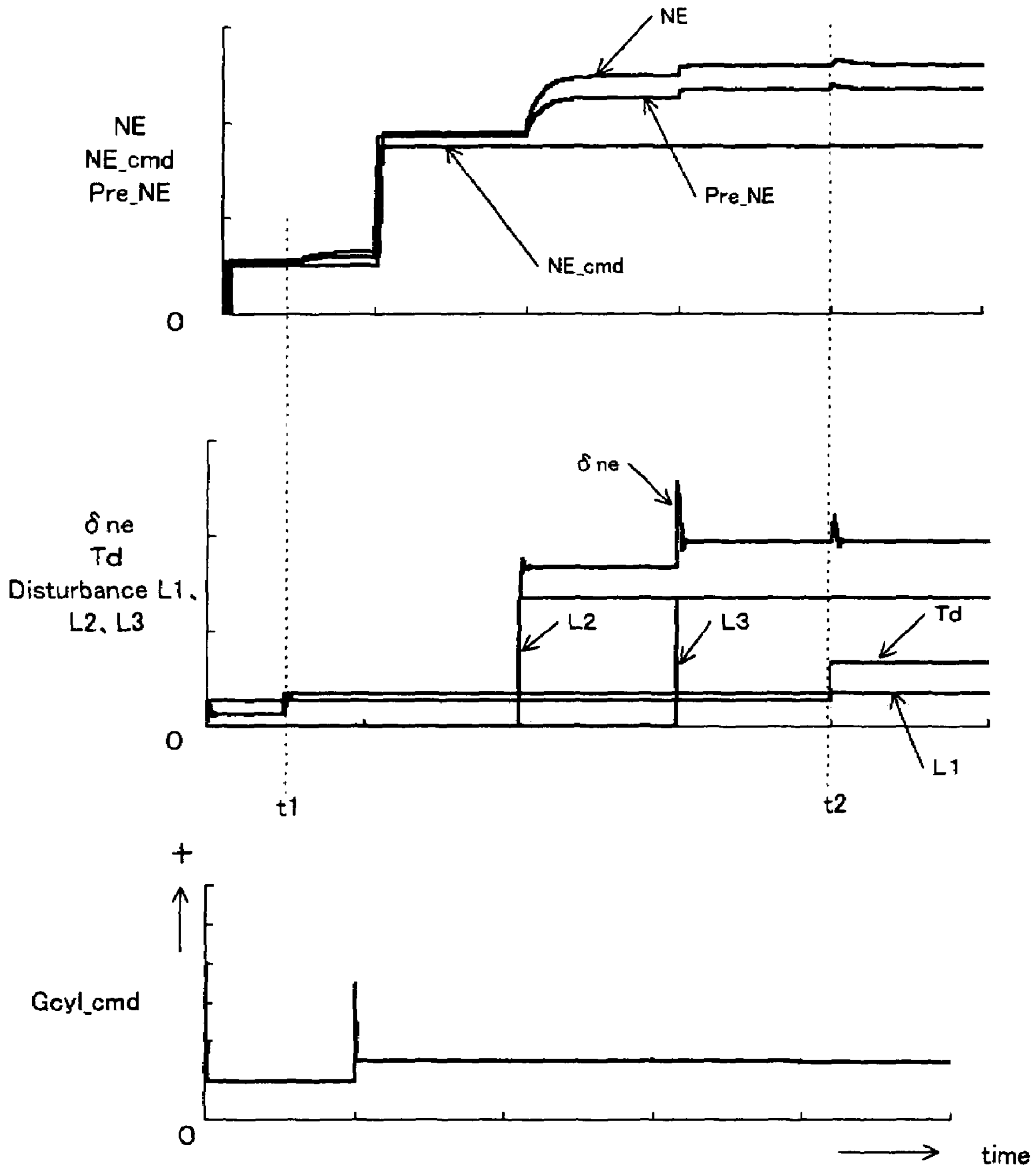
FIG. 19 shows a result of a case N-3 for a rotational speed control simulation in accordance with one embodiment of the present invention.

In the case N-3, the predictor 42 and the control unit 43 use the driving torque Td. The estimated disturbance value δne is not used in either the predictor 42 or the control unit 43. FIG. 19 shows a result of the simulation case N-3. At time t1, an estimation error Td_error for the driving torque Td is applied as a step input. In response, the estimated disturbance value δne increases. Since the feedforward term for the driving torque Td is used, the error between the actual rotational speed NE and the predicted value Pre_NE keeps unchanged.

At time t2, the driving torque Td changes. The other disturbances L2 and L3 are still applied to the plant. The error between the actual rotational speed NE and the predicted value Pre_NE does not change by virtue of the feedforward term for the driving torque Td. However, since the estimated disturbance value δne is not used, a steady-state error between the actual rotational speed NE and the predicted value Pre_NE cannot be eliminated, and hence the rotational speed NE cannot converge to the desired value NE_cmd.

In the case N-4, the estimated disturbance value δne and the driving torque Td are not used in either the predictor 42 or the control unit 43. An adaptive law input Uadp is added to the control input in the control unit 43. The adaptive law input Uadp is expressed by the equation (63). "G" denotes a gain of the adaptive law input.

$$Uadp(k) = \frac{-G}{Bne}\sum_{i=0}^{k+dth}\delta ne(i) \quad (63)$$

Figure 20:
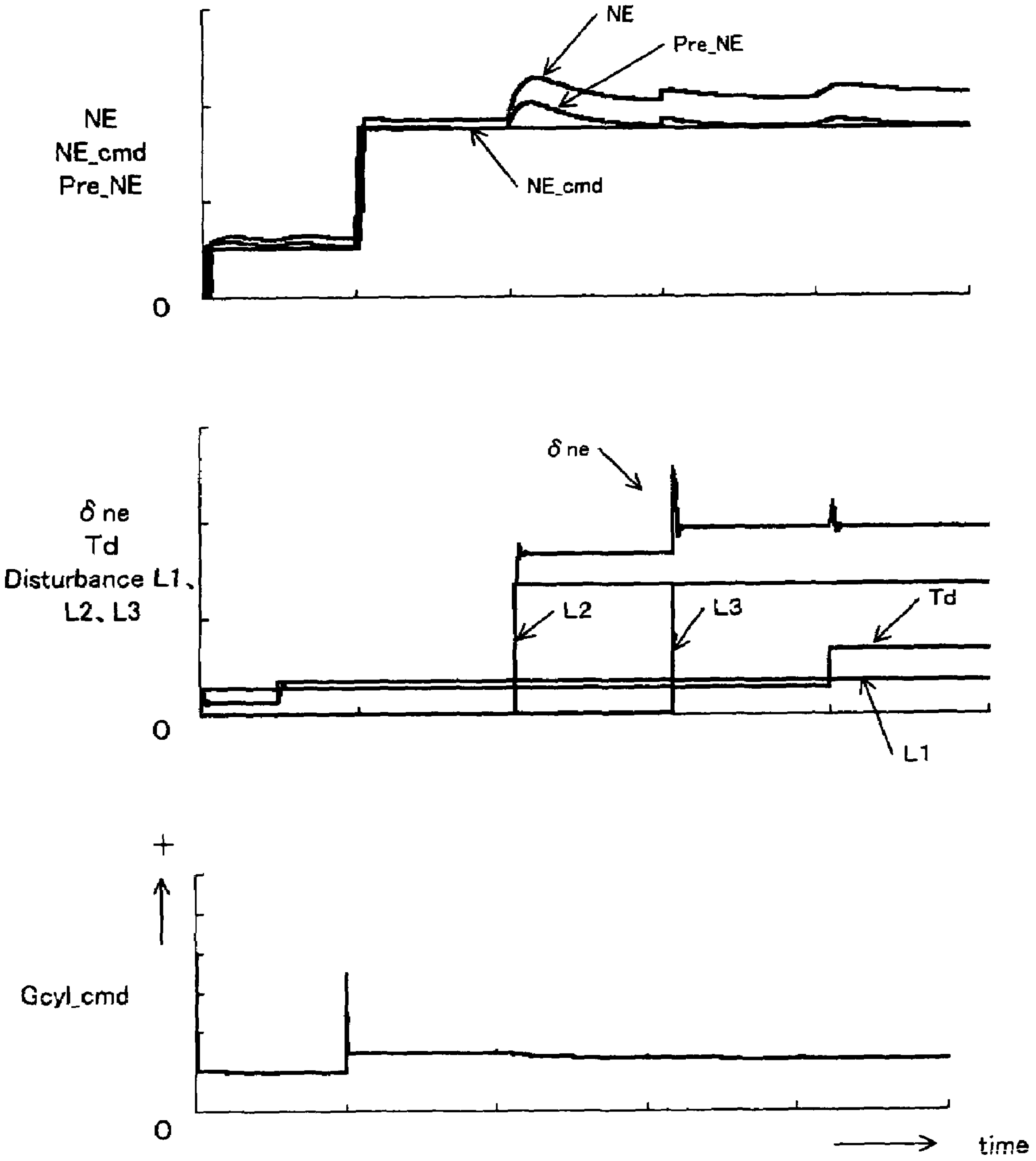
FIG. 20 shows a result of a case N-4 for a rotational speed control simulation in accordance with one embodiment of the present invention.

FIG. 20 shows a result of the simulation case N-4. The predicted value Pre_NE converges to the desired value NE_cmd by the control unit 43. However, since the predicted value Pre_NE is not calculated based on the estimated disturbance value δne, a steady-state error between the actual rotational speed NE and the predicted value Pre_NE cannot be eliminated, and hence the rotational speed NE cannot converge to the desired value NE_cmd.

In the case N-5, the driving torque Td and the estimated disturbance value δne are used in the predictor 42. In the control unit 43, the driving torque Td is used. The control unit 43 does not use the estimated disturbance value δne. Instead, the adaptive law input Uadp is added to the control input in the control unit 43.

Figure 21:
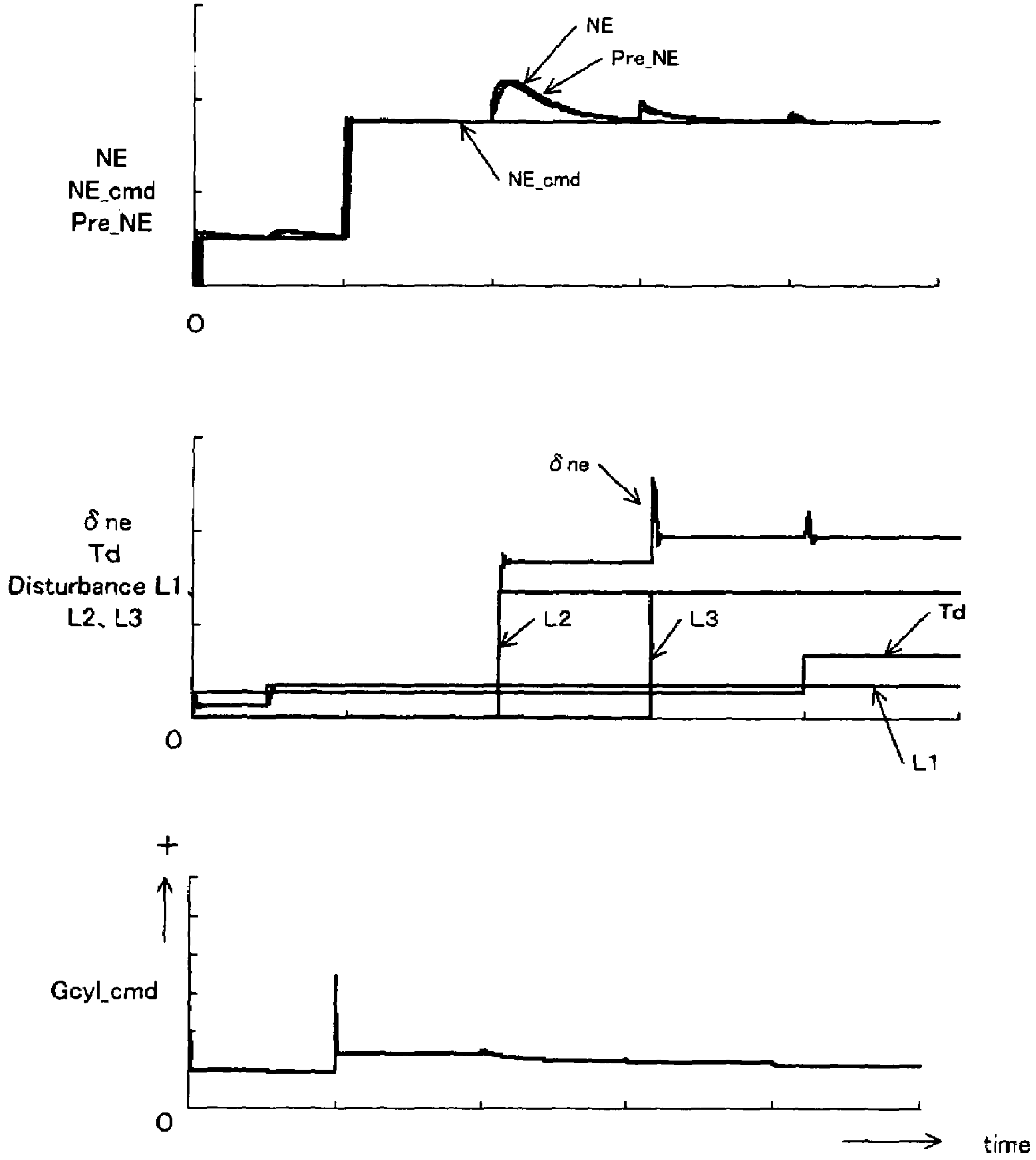
FIG. 21 shows a result of a case N-5 for a rotational speed control simulation in accordance with one embodiment of the present invention.

FIG. 21 shows a result of the simulation case N-5. The convergence time of the rotational speed NE can be shorten by increasing the gain G of the adaptive law input Uadp. However, as apparent from comparison with FIG. 17, integral overshooting occurs when the gain G increases.

Now, a case having no dead time will be examined. In such a case, the state predictor may be removed. A model for an inertial system of the engine for controlling the engine rotational speed NE can be expressed as shown by the equation (64).

$$NE(k+1)=Ane\cdot NE(k)+Bne\cdot Gcyl_{cmd}(k)+Cne\cdot Td(k) \quad (64)$$

Since there exists no dead time, the equation (52), which is executed by the adaptive disturbance observer 41, is expressed by the equation (65).

$$\delta ne(k) = \delta ne(k+1) + \frac{Pdne(k-1)}{1+Pdne(k-1)}\text{e\_dne}(k) \quad (65)$$

where $\text{e\_dne} = NE(k) - \text{NE\_hat}(k)$

-continued $$NE\_hat(k) = Ane1 \cdot NE(k-1) + Bne1 \cdot Gcyl\_cmd(k-1) + \gamma ne \cdot Td(k-1) + \gamma ne \cdot \delta ne(k-1)$$

$$Pdne(k) = \frac{1}{\lambda_1}\left(1 - \frac{\lambda_2 Pdne(k-1)}{\lambda_1 + \lambda_2 Pdne(k-1)}\right)Pdne(k-1)$$

Since there exists no dead time, the equations (61) and (62), which are executed by the control unit 43, are expressed by the equations (66) and (67), respectively.

$$Ueq(k) = 1/Bne\{(1 - Ane - S\_ne)NE(k) + S\_ne \cdot NE(k-1) + NE\_cmd(k+1) + (S\_ne - 1) \cdot NE\_cmd(k) - S\_ne \cdot NE\_cmd(k-1) - Cne \cdot Td(k) - Cne \cdot \delta ne(k)\} \quad (66)$$

$$Urch(k) = \frac{-F}{Bne}\sigma ne(k) \quad (67)$$

where $0 < F < 2$

As to cases N-6 through N-9 having no dead time, simulations as shown in Table 4 have been carried out.

TABLE 4

| case number | disturbance L1, L2, L3 | use of the F/B term for the estimated disturbance value δ ne | use of the F/F term for the driving torque Td | use of the adaptive law input Uadp |
|---|---|---|---|---|
| N-6 | ○ | ○ | ○ | |
| N-7 | ○ | | ○ | |
| N-8 | ○ | | ○ | ○ (G: smaller) |
| N-9 | ○ | | ○ | ○ (G: larger) |

Figure 22:
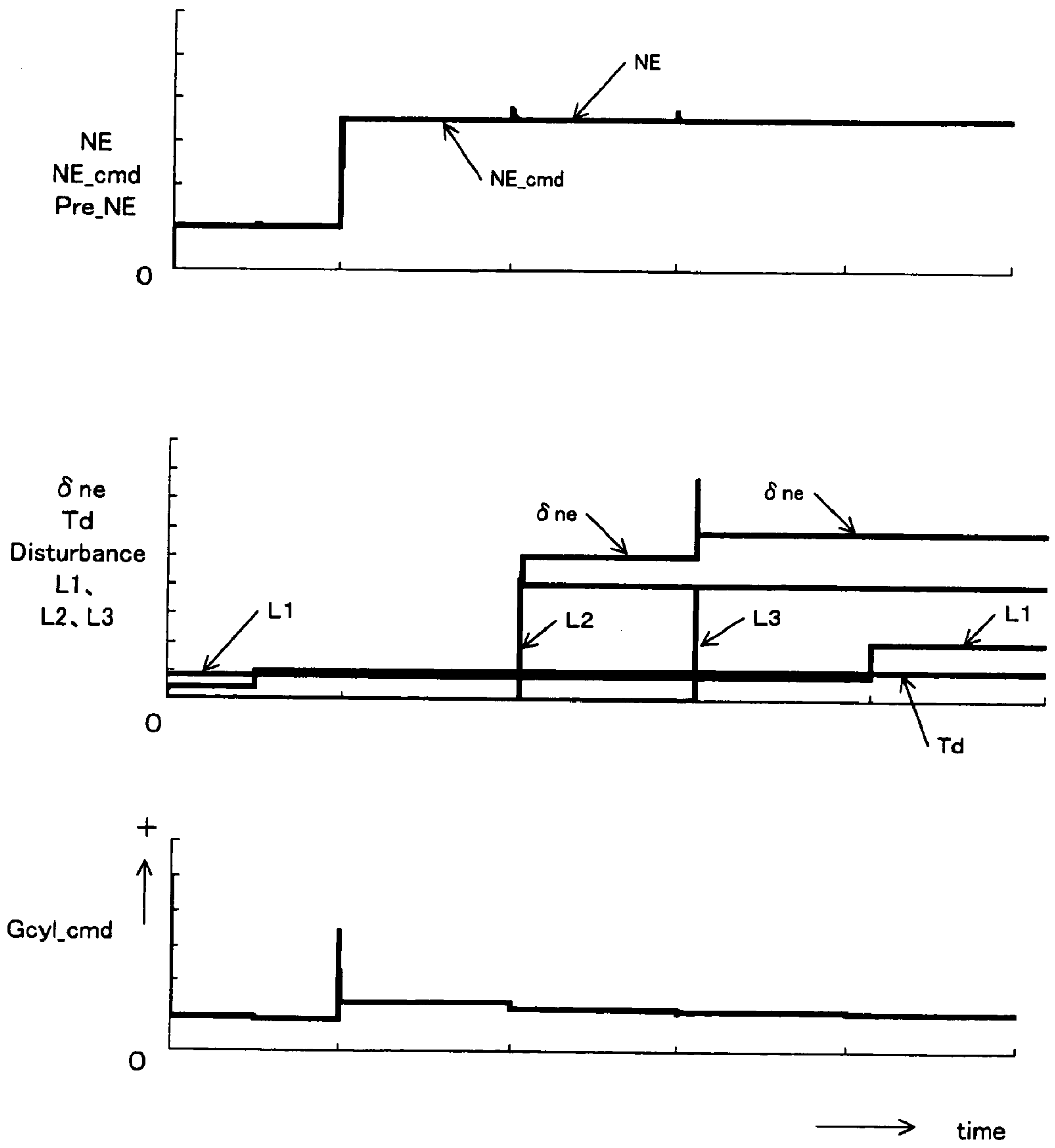
FIG. 22 shows a result of a case N-6 for a rotational speed control simulation in accordance with one embodiment of the present invention.

In the case N-6, the disturbances L1 through L3 are added. The estimated disturbance value δne and the driving torque Td are used in the control unit 43. The case N-6 is a preferable case based on the rotational speed FB control in accordance with one embodiment of the present invention as described above. FIG. 22 shows a result of the simulation case N-6. Under the condition in which the disturbances are applied, the rotational speed NE can converge to the desired value NE_cmd without generating any steady-state error. The capability that the rotational speed NE follows the desired value NE_cmd when the desired value NE_cmd changes is good.

Figure 23:
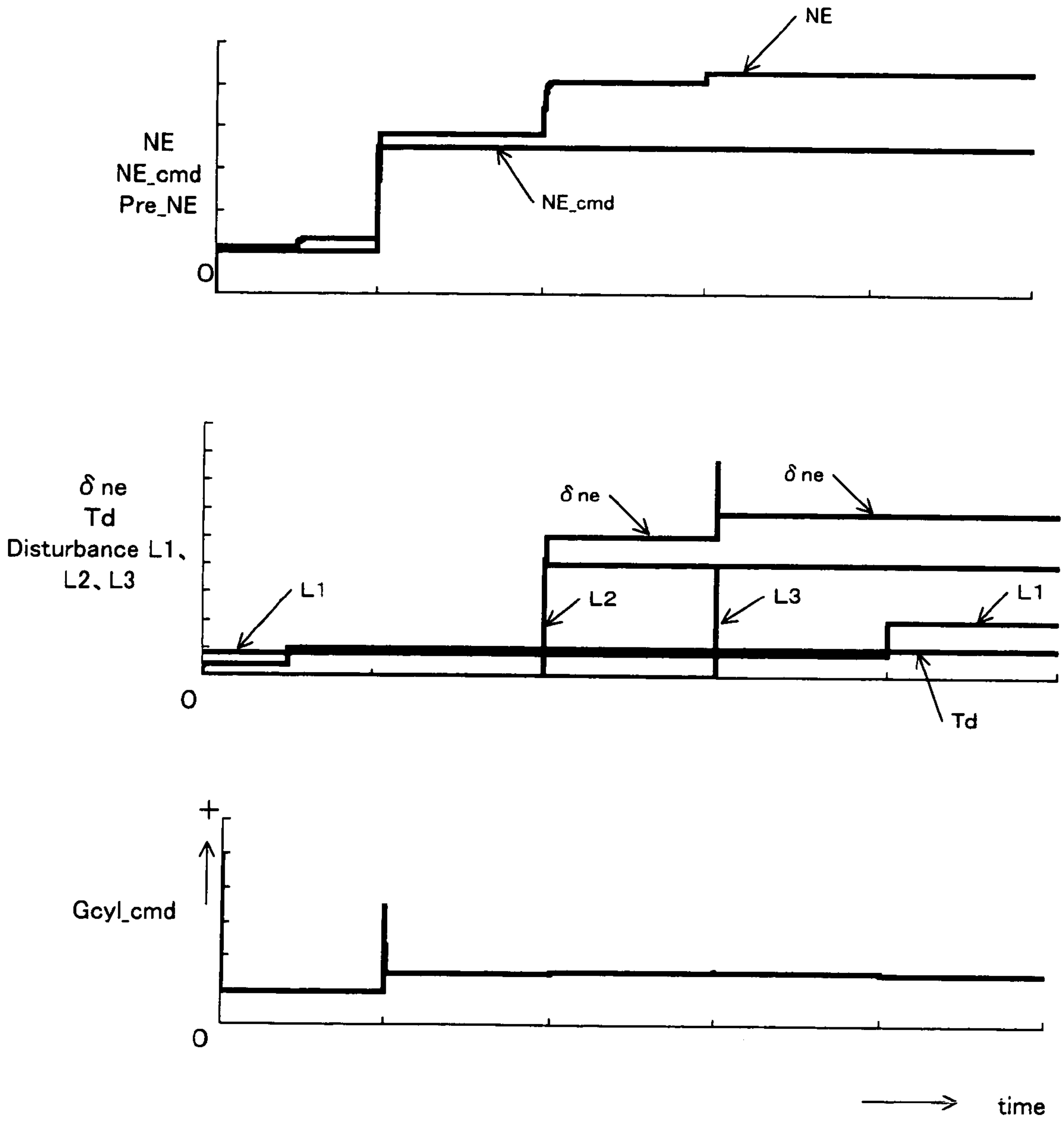
FIG. 23 shows a result of a case N-7 for a rotational speed control simulation in accordance with one embodiment of the present invention.

In the case N-7, the driving torque Td is used in the control unit 43. The control unit 43 does not use the estimated disturbance value δne. FIG. 23 shows a result of the simulation case N-7. It is seen that the error between the actual rotational speed NE and the desired value NE_cmd increases each time the disturbance are applied. The actual rotational speed NE cannot converge to the desired value NE_cmd since the estimated disturbance value δne is not used.

Figure 24:
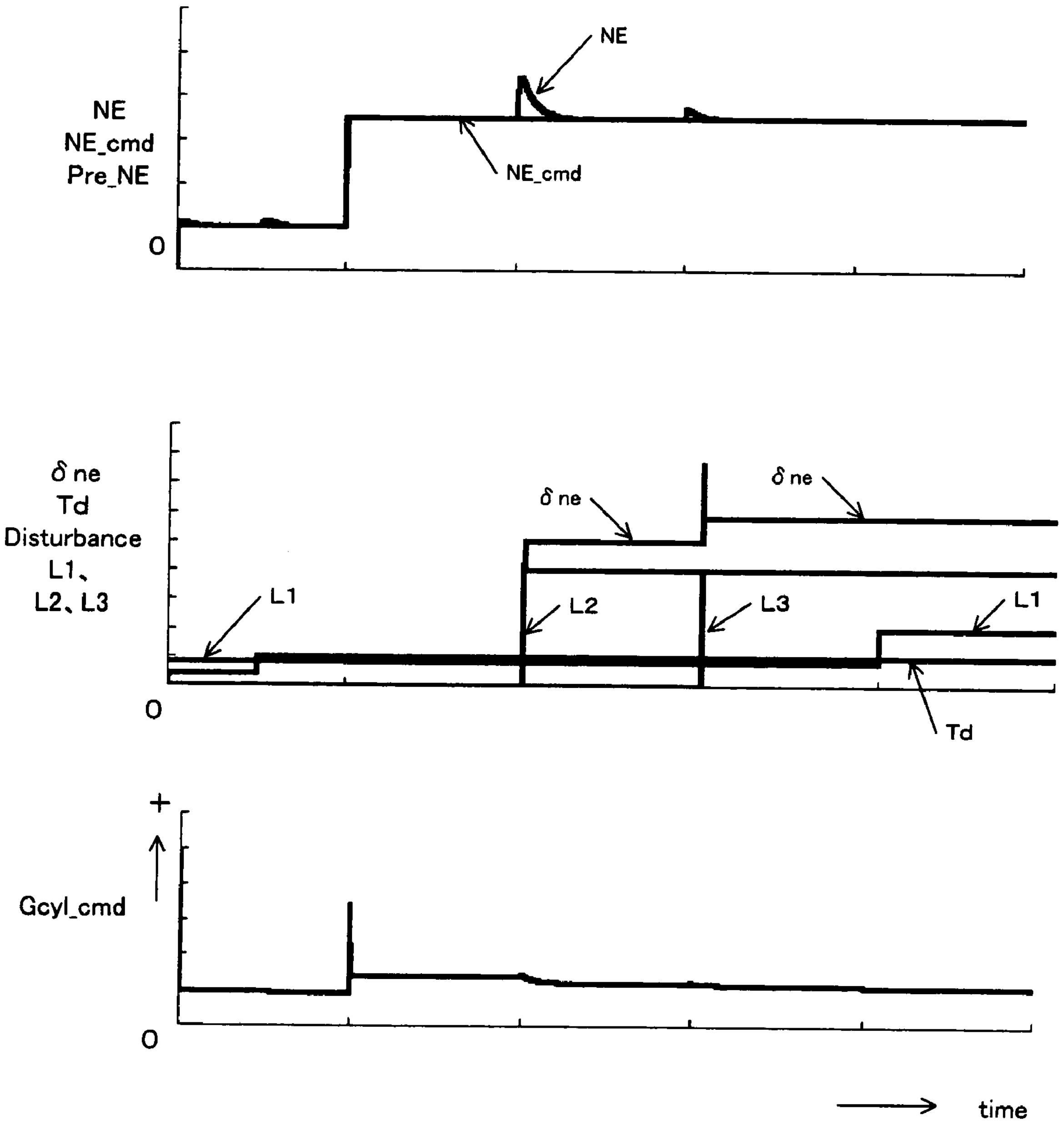
FIG. 24 shows a result of a case N-8 for a rotational speed control simulation in accordance with one embodiment of the present invention.
Figure 25:
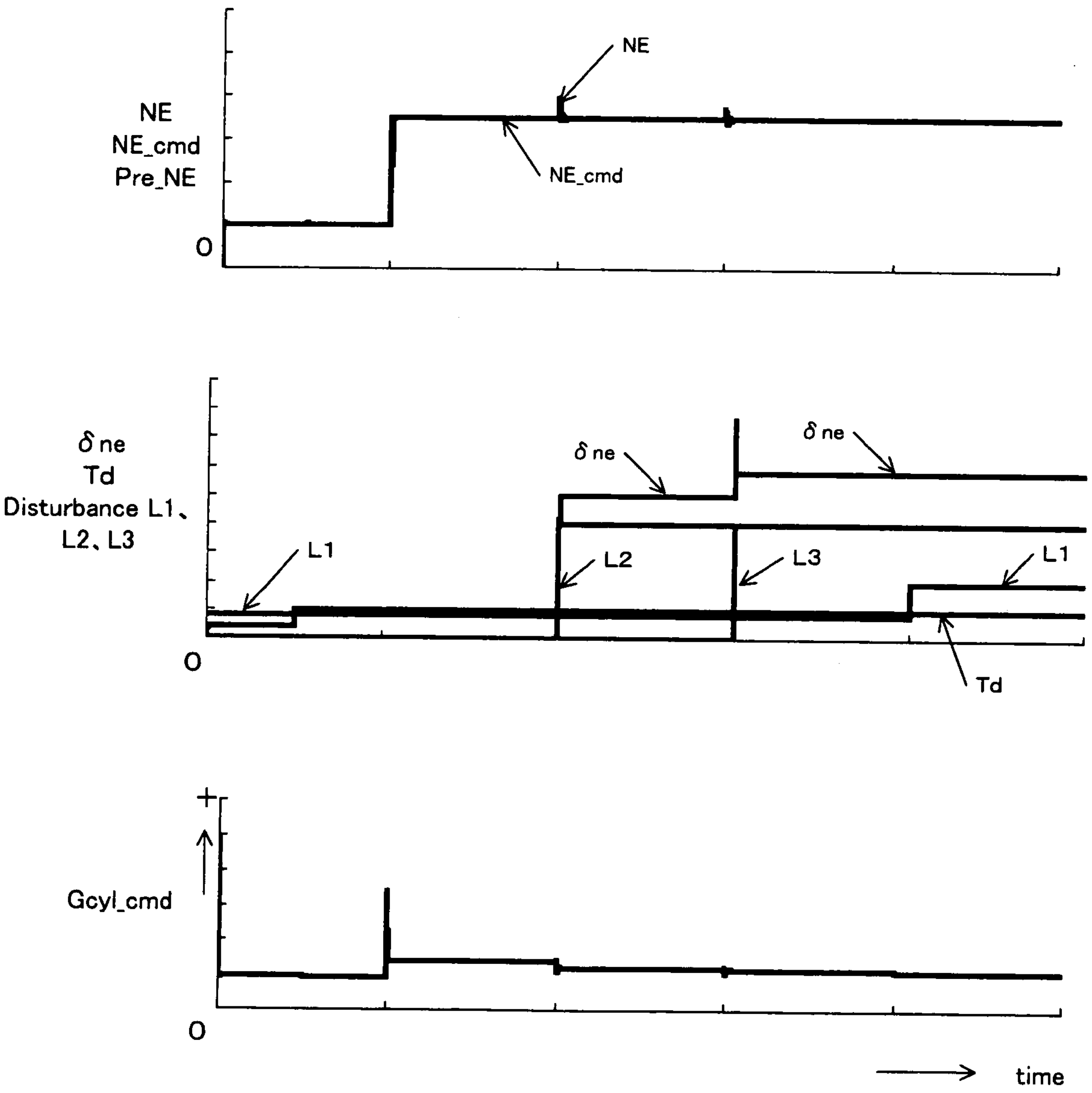
FIG. 25 shows a result of a case N-9 for a rotational speed control simulation in accordance with one embodiment of the present invention.
Figure 26:
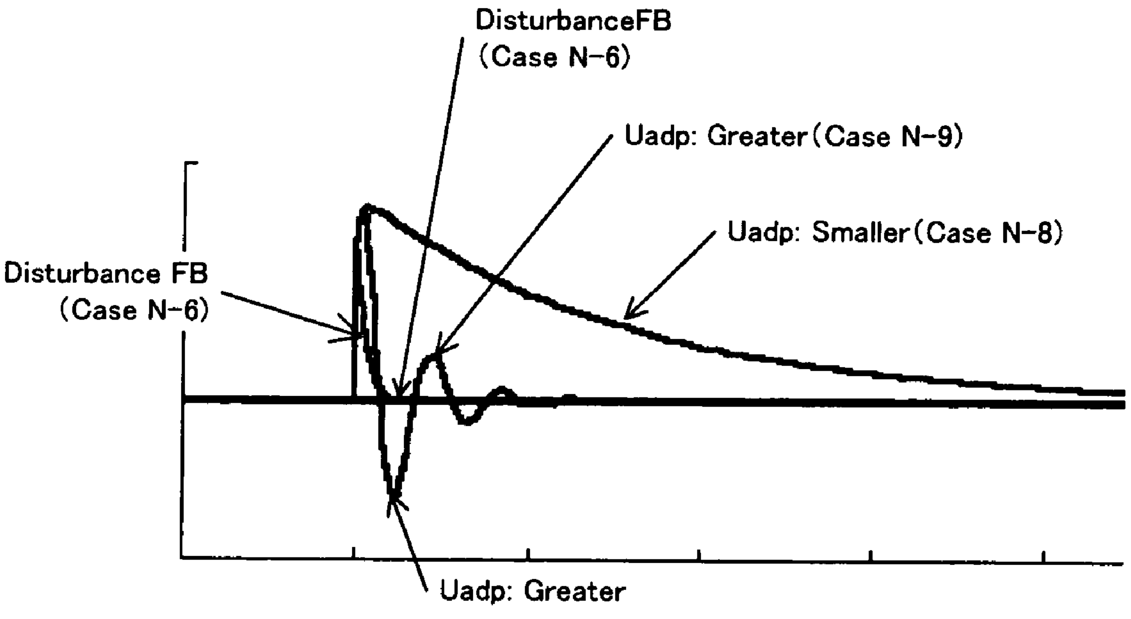
FIG. 26 shows a comparison between the case N-8 and the case N-9 for the rotational speed control simulation in accordance with one embodiment of the present invention.

In the case N-8, the estimated disturbance value δne is not used in the control unit 43. The adaptive law input Uadp is added to the control input. In the case N-8, a gain G having a relatively small value is used. FIG. 24 shows a result of the simulation case N-8. In the case N-9, a gain G having a relatively large value is used in the control unit 43. FIG. 25 shows a result of the simulation case N-9. FIG. 26 shows a comparison between the behavior of the rotational speed NE shown in FIG. 25 (case N-9) and the behavior of the rotational speed NE shown in FIG. 24 (case N-8). By increasing the gain G of the adaptive law input Uadp, the convergence time of the rotational speed NE is shorten. However, integral overshooting occurs when the gain G increases. In contrast, by using the estimated disturbance value δne corresponding to the case N-6, the rotational speed NE can converge to the desired value NE_cmd without causing integral overshooting.

In the above-described embodiments, the adaptive disturbance observer using the recursive identification algorithm is used so as to estimate a disturbance. Alternatively, another appropriate estimator that refers to a predetermined map or the like may be used to determine a disturbance.

3. Operation Flow

Figure 27:
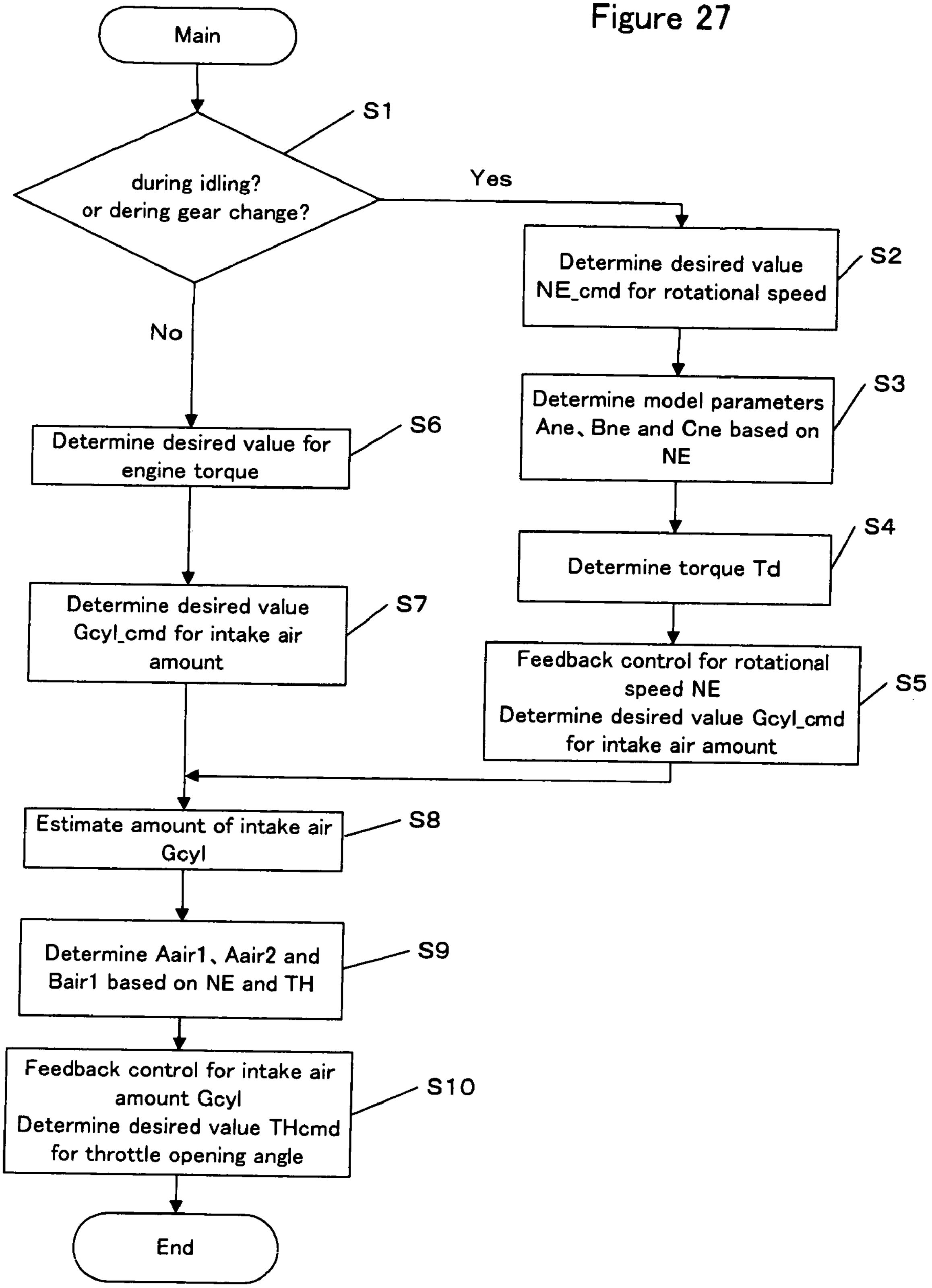
FIG. 27 shows a flowchart of a rotational speed feedback control and an intake air amount feedback control in accordance with one embodiment of the present invention.

FIG. 27 shows a flowchart of the rotational speed FB control and the intake air amount FB control in accordance with one embodiment of the present invention shown in FIG. 2. This flowchart can be applied to a vehicle using any of a manual transmission (MT), an automatic manual transmission (automatic MT) and an automatic transmission (AT).

In step S1, it is determined whether the vehicle is idling or gear change is being carried out in the transmission. When the answer of step S1 is YES, the process proceeds to step S2 to perform the above-described rotational speed FB control.

In step S2, a desired engine rotational speed NE_cmd is determined. For example, when the engine is idling, the desired value NE_cmd is set to a value in accordance with traveling conditions, warming-up state and so on. When gear change is being carried out, the desired value NE_cmd is set to a value in accordance with a vehicle speed and a selected gear ratio.

In step S3, a map stored in the memory 1*c* of the ECU 1 is referred to based on the detected actual rotational speed NE to extract the model parameters Ane, Bne and Cne. In step S4, the equipment-driving torque Tload and the vehicle-driving torque Tdrv are determined. The equipment-driving torque Tload may be calculated in accordance with, for example, an ON/OFF state of electrical components mounted on the vehicle. The vehicle-driving torque Tdrv may be calculated in accordance with traveling resistance, clutch conditions and so on. Tload and Tdrv are added to determine a driving torque Td as a disturbance. In step S5, the above-described rotational speed FB control is carried out to calculate the desired intake air amount Gcyl_cmd.

On the other hand, when the vehicle is in a normal running condition, the process proceeds to step S6, in which a desired engine torque is determined. The desired engine torque may be calculated in accordance with an opening angle of the accelerator pedal, vehicle speed, selected gear ratio, running environment and so on. In step S7, the intake air amount Gcyl_cmd required for implementing the desired engine torque is calculated. For example, the desired intake air amount Gcyl_cmd can be determined by referring to a predetermined map based on the air/fuel ratio and the ignition timing.

In step S8, the intake air amount Gcyl is estimated. The intake air amount Gcyl can be estimated based on the outputs from the airflow meter 10 and the Pb sensor 11. In step S9, a predetermined map is referred to based on the engine rotational speed NE and the throttle opening angle TH to extract the model parameters Aair1, Aair2 and Bair1. Instead of an opening angle of the throttle valve, the air amount Gth that passes through the throttle valve or the intake air amount Gcyl calculated in step S8 may be used.

In step S10, the above-described intake air amount FB control is carried out to calculate the desired throttle opening angle THcmd.

It should be noted that a control scheme according to the invention may be applied to various objects. A preview control according to the invention may be applied to various objects. A response assignment control according to the invention may be also applied to various objects.

The invention may be applied to an engine to be used in a vessel-propelling machine such as an outboard motor in which a crankshaft is disposed in the perpendicular direction.

What is claimed is:

1. A control system for controlling a modeled plant, comprising a controller configured to:

estimate disturbance applied to the plant;

determine a predicted value for an output of the plant by using the estimated disturbance and dead time included in the plant; and determine an input to the plant so that the predicted value converges to a desired value for the output of the plant.

2. The control system of claim 1, wherein the controller is further configured to use a preview control algorithm to determine the input to the plant.

3. The control system of claim 1, wherein the controller is further configured to use a response assignment control algorithm to determine the input to the plant.

4. The control system of claim 1, wherein the controller is further configured to determine the input to the plant to include a value obtained by multiplying the estimated disturbance by a predetermined gain.

5. The control system of claim 1, wherein the controller includes an adaptive disturbance observer that uses a recursive identification algorithm to identify the estimated disturbance.

6. The control system of claim 2, wherein the controller is further configured to determine the input to the plant to include a value obtained by multiplying a desired value for the output of the plant by a predetermined gain.

7. The control system of claim 2, wherein the plant is an intake manifold connected to an engine, wherein the intake manifold is modeled so that an input of the plant is a desired value for an opening angle of a valve that controls an amount of intake air into the intake manifold and an output of the plant is an amount of intake air into the engine.

8. The control system of claim 7, wherein the controller includes a storage device for storing model parameters for the modeled plant, wherein the controller is further configured to extract a model parameter based on a detected engine rotational speed and a detected opening angle of a throttle valve and to determine the input to the plant based on the extracted model parameter.

9. The control system of claim 3, wherein the plant is an engine, wherein the engine is modeled so that an input of the plant is a desired value for an amount of intake air into the engine and an output of the plant is a rotational speed of the engine.

10. The control system of claim 9, wherein the controller includes a storage device for storing model parameters for the modeled plant, wherein the controller is further configured to extract a model parameter based on a detected engine rotational speed and to determine the input to the plant based on the extracted model parameter.

11. The control system of claim 9, wherein the controller is further configured to determine the input to the plant to include a value obtained by multiplying by a predetermined gain an estimated value for a torque that is required to drive a vehicle on which the engine is mounted.

12. The control system of claim 9, wherein the controller is further configured to determine the input to the plant to include a value obtained by multiplying by a predetermined gain an estimated value for a torque that is required to drive an equipment on a vehicle on which the engine is mounted.

13. The control system of claim of claim 9, wherein the controller is further configured to predict the output of the plant based on an estimated value for a torque that is required to drive a vehicle on which the engine is mounted.

14. The control system of claim of claim 9, wherein the controller is further configured to predict the output of the plant based on an estimated value for a torque that is required to drive an equipment on a vehicle on which the engine is mounted.

15. A method for controlling a modeled plant, comprising the steps of:

(a) estimating disturbance applied to the plant;

(b) determining a predicted value for an output of the plant by using the estimated disturbance and dead time included in the plant; and (c) determining an input to the plant so that the predicted value converges to a desired value for the output of the plant.

16. The method of claim 15, wherein the step (c) further comprises the step of using a preview control algorithm to determine the input to the plant.

17. The method of claim 15, wherein the step (c) further comprises the step of using a response assignment control algorithm to determine the input to the plant.

18. The method of claim 15, wherein the step (c) further comprises the step of determining the input to the plant to include a value obtained by multiplying the estimated disturbance by a predetermined gain.

19. The method of claim 15, wherein the step (a) further comprises the step of using a recursive identification algorithm to identify the estimated disturbance.

20. The method of claim 16, wherein the step (c) further comprises the step of determining the input to the plant to include a value obtained by multiplying a desired value for the output of the plant by a predetermined gain.

21. A controller for controlling a modeled plant, comprising:

(a) means for estimating disturbance applied to the plant;

(b) means for determining a predicted value for an output of the plant by using the estimated disturbance and dead time included in the plant; and (c) means for determining an input to the plant so that the predicted value converges to a desired value for the output of the plant.

22. The controller of claim 21, wherein the means (c) further comprises means for using a preview control algorithm to determine the input to the plant.

23. The controller of claim 21, wherein the means (c) further comprises means for using a response assignment control algorithm to determine the input to the plant.

24. The controller of claim 21, wherein the means (c) further comprises means for determining the input to the plant to include a value obtained by multiplying the estimated disturbance by a predetermined gain.

25. The controller of claim 21, wherein the means (a) further comprises means for using a recursive identification algorithm to identify the estimated disturbance.

26. The controller of claim 22, wherein the means (c) further comprises means for determining the input to the plant to include a value obtained by multiplying a desired value for the output of the plant by a predetermined gain.

* * * * *

UNITED STATES PATENT AND TRADEMARK OFFICE

CERTIFICATE OF CORRECTION

PATENT NO. : 7,305,297 B2

APPLICATION NO. : 11/642550

DATED : December 4, 2007

INVENTOR(S) : Yuji Yasui et al.

It is certified that error appears in the above-identified patent and that said Letters Patent is hereby corrected as shown below:

On the Title Page item (75): line 3, should read:

--Yoshihisa IWAKI--

Signed and Sealed this

Eleventh Day of November, 2008

JON W. DUDAS

*Director of the United States Patent and Trademark Office*